United States Patent
Steege

(10) Patent No.: US 11,858,216 B2
(45) Date of Patent: Jan. 2, 2024

(54) METHOD AND APPARATUS FOR SOLID FREEFORM FABRICATION OF OBJECTS UTILIZING IN SITU INFUSION

(71) Applicant: Trio Labs, Inc., Morrisville, NC (US)

(72) Inventor: Adam T. C. Steege, Durham, NC (US)

(73) Assignee: TRIO LABS, INC., Morrisville, NC (US)

( * ) Notice: Subject to any disclaimer, the term of this patent is extended or adjusted under 35 U.S.C. 154(b) by 0 days.

(21) Appl. No.: 17/549,653

(22) Filed: Dec. 13, 2021

(65) Prior Publication Data

US 2022/0105678 A1    Apr. 7, 2022

Related U.S. Application Data

(62) Division of application No. 16/079,402, filed as application No. PCT/US2017/019371 on Feb. 24, 2017, now Pat. No. 11,235,520.

(Continued)

(51) Int. Cl.
*B29C 64/336* (2017.01)
*B33Y 10/00* (2015.01)
(Continued)

(52) U.S. Cl.
CPC .............. *B29C 64/336* (2017.08); *B22F 3/26* (2013.01); *B22F 10/14* (2021.01); *B22F 10/30* (2021.01);
(Continued)

(58) Field of Classification Search
CPC ... B29C 64/336; B29C 64/153; B29C 64/165; B29C 64/205; B29C 64/314; B29C 64/245; B29C 64/324; B29C 64/393
See application file for complete search history.

(56) References Cited

U.S. PATENT DOCUMENTS

| 5,252,264 A | 10/1993 | Forderhase et al. |
| 5,640,667 A | 6/1997 | Frietag et al. |

(Continued)

FOREIGN PATENT DOCUMENTS

| CN | 104589651 A | 5/2015 |
| CN | 204431744 U | 7/2015 |

(Continued)

OTHER PUBLICATIONS

CN, First Office Action, Application No. 201780024016.8, dated Mar. 6, 2020.

(Continued)

*Primary Examiner* — Nahida Sultana
(74) *Attorney, Agent, or Firm* — Orrick, Herrington & Sutcliffe LLP

(57) ABSTRACT

A fabrication device includes a platform to receive layers of build material for production of a 3-dimensional solid representation of a digital model, a component to deposit layers of build material, and an imagining component to bind respective portions of the build material into cross sections representative of portions of data contained in the digital model. The first imaging component may be a programmable planar light source or a specialized refractive rastering mechanism, or other imaging system. The platform includes an infusion system for providing photocurable resin to the component being built. The object may be a powder composite component using any of a variety of powder materials or a plastic component.

16 Claims, 56 Drawing Sheets

Related U.S. Application Data

(60) Provisional application No. 62/342,290, filed on May 27, 2016, provisional application No. 62/300,105, filed on Feb. 26, 2016.

(51) Int. Cl.

| | |
|---|---|
| *B33Y 30/00* | (2015.01) |
| *B29C 64/314* | (2017.01) |
| *B33Y 40/00* | (2020.01) |
| *B29C 64/165* | (2017.01) |
| *B29C 64/205* | (2017.01) |
| *B33Y 40/20* | (2020.01) |
| *B29C 64/153* | (2017.01) |
| *B22F 3/26* | (2006.01) |
| *B22F 10/14* | (2021.01) |
| *B22F 10/30* | (2021.01) |
| *B22F 12/30* | (2021.01) |
| *B22F 12/55* | (2021.01) |
| *B22F 12/63* | (2021.01) |
| *B22F 10/43* | (2021.01) |

(52) U.S. Cl.
CPC .......... *B29C 64/153* (2017.08); *B29C 64/165* (2017.08); *B29C 64/205* (2017.08); *B29C 64/314* (2017.08); *B33Y 10/00* (2014.12); *B33Y 30/00* (2014.12); *B33Y 40/00* (2014.12); *B33Y 40/20* (2020.01); *B22F 10/43* (2021.01); *B22F 12/30* (2021.01); *B22F 12/55* (2021.01); *B22F 12/63* (2021.01)

(56) References Cited

U.S. PATENT DOCUMENTS

| | | | |
|---|---|---|---|
| 5,976,448 A | 11/1999 | Haruta et al. | |
| 6,036,777 A | 3/2000 | Sachs | |
| 6,932,935 B1 | 8/2005 | Oberhofer et al. | |
| 7,036,550 B2 | 5/2006 | Schaffer et al. | |
| 7,120,512 B2 | 10/2006 | Kramer et al. | |
| 7,686,995 B2* | 3/2010 | Davidson | B41J 2/16552 |
| | | | 425/130 |
| 2002/0062909 A1 | 5/2002 | Jang et al. | |
| 2002/0093115 A1 | 7/2002 | Jang et al. | |
| 2005/0059757 A1 | 3/2005 | Bredt et al. | |
| 2010/0044547 A1* | 2/2010 | Higashi | B29C 64/153 |
| | | | 425/78 |
| 2012/0060711 A1 | 3/2012 | Rudolph | |
| 2013/0075575 A1* | 3/2013 | Abe | B33Y 10/00 |
| | | | 419/7 |
| 2014/0135714 A1* | 5/2014 | Verrilli | B29C 66/8161 |
| | | | 425/457 |
| 2015/0291921 A1 | 10/2015 | Rives | |
| 2015/0367415 A1 | 12/2015 | Buller et al. | |
| 2015/0367488 A1* | 12/2015 | Koehler | F16B 17/00 |
| | | | 29/268 |
| 2016/0177122 A1* | 6/2016 | Naruse | B33Y 70/10 |
| | | | 523/205 |
| 2017/0021455 A1 | 1/2017 | Dallarosa et al. | |
| 2020/0198233 A1* | 6/2020 | Yang | B29C 64/245 |
| 2022/0347739 A1* | 11/2022 | Hascoët | B22C 19/02 |

FOREIGN PATENT DOCUMENTS

| | | |
|---|---|---|
| CN | 204471892 U | 7/2015 |
| CN | 204914585 U | 12/2015 |
| JP | H03-183530 A | 9/1991 |
| JP | 2000-234104 A | 8/2000 |
| JP | 2001-522326 A | 11/2001 |
| JP | 2001-341208 A | 12/2001 |
| JP | 2002-292751 A | 10/2002 |
| JP | 2015-174338 A | 10/2015 |
| WO | WO 98/48993 A1 | 11/1998 |
| WO | WO 2014/110679 A1 | 7/2014 |
| WO | WO 2015/091826 A1 | 6/2015 |

OTHER PUBLICATIONS

CN, Second Office Action, Application No. 201780024016.8, dated Dec. 8, 2020.
CN, Third Office Action, Application No. 201780024016.8, dated Jun. 2, 2021.
EP, Partial European Searph Report, Application No. 17757309.4, dated Sep. 20, 2019.
IL, Examination Report, Application No. 261252, dated Aug. 15, 2021.
IN, Exam Report, Application No. 201817032990, dated Dec. 1, 2020.
JP, Office Action, Application No. 2018-544260, dated Mar. 9, 2021.
JP, Notice for Refusal, Application No. 2018-544260, dated Aug. 3, 2021.
WO, International Search Report and Written Opinion, Application No. PCT/US2017/019371, dated May 19, 2017.
EP, Communication pursuant to Article 94(3) EPC, Application No. 17757309.4, dated Feb. 22, 2022.
EP, Communication pursuant to Article 94(3) EPC, Application No. 17 757 309.4, dated Jul. 25, 2022.
JP, Office Action, Appliction No. 2021-190414, dated Jul. 26, 2022.
Technical Examination Report in BR112018067374-9, dated Oct. 18, 2022, 4 pages.
Mexican Office Action in Mexican Application No. MX/a/2018/010135, dated Jun. 6, 2023, 8 pages.
Examiner's Report in CA3016758, dated Mar. 17, 2023, 6 pages.

* cited by examiner

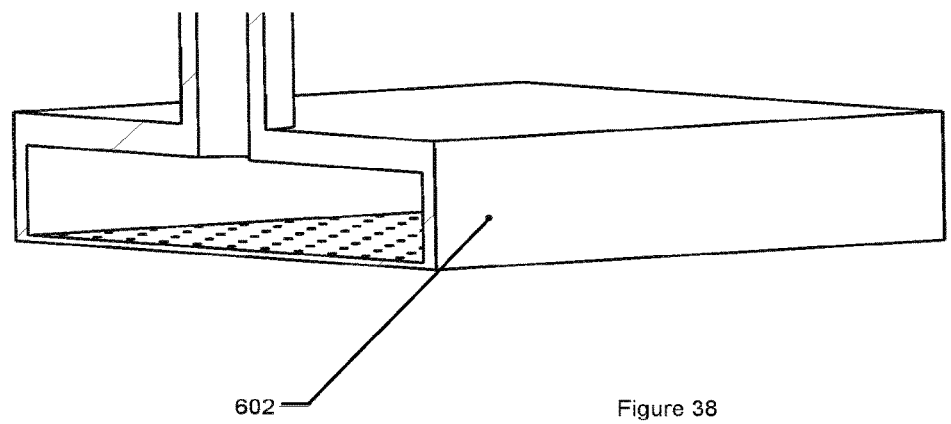
Figure 38
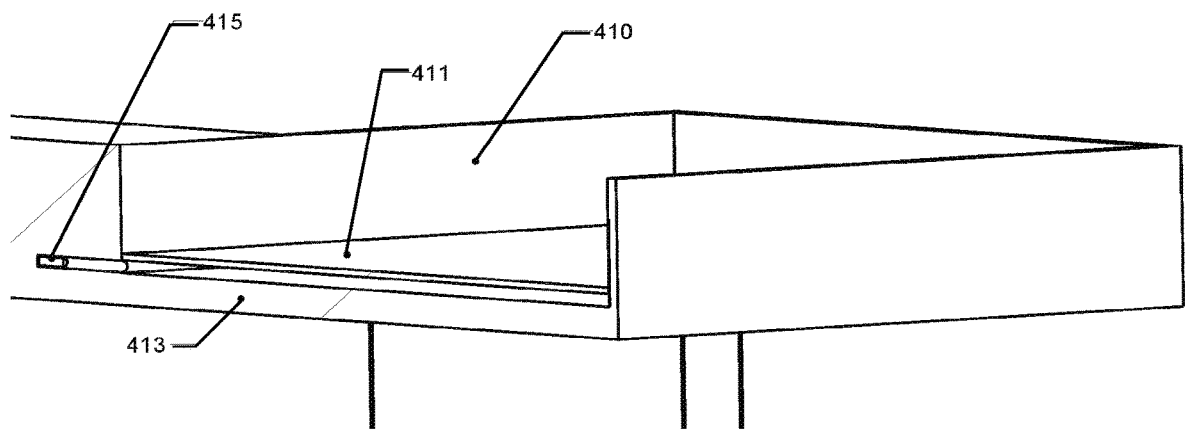

METHOD AND APPARATUS FOR SOLID FREEFORM FABRICATION OF OBJECTS UTILIZING IN SITU INFUSION

CROSS-REFERENCE TO RELATED APPLICATIONS

The present application is a divisional application of co-pending U.S. application Ser. No. 16/079,402, filed Aug. 23, 2018, which is the National Phase of PCT application No. PCT/US2017/019371 filed Feb. 24, 2017, which claims the benefit of U.S. Provisional Patent Application Ser. No. 62/300,105, filed Feb. 26, 2016, and U.S. Provisional Patent Application Ser. No. 62/342,290, filed May 27, 2016, the disclosures of which are incorporated herein by reference in their entireties.

TECHNICAL FIELD

The subject matter disclosed herein relates generally to solid freeform fabrication of objects. More particularly, the subject matter disclosed herein relates to systems, devices, and methods for solid freeform fabrication of objects from metal, plastic, ceramic, and composite materials comprising combinations of one or more types of material.

BACKGROUND

Additive manufacturing (AM), also known as solid freeform fabrication (SFF), 3D printing (3DP), direct digital manufacturing (DDM), and solid imaging, has increasingly become a widely adopted method of prototyping both visually demonstrative and functional parts. In some instances, this has become a cost effective means for production manufacturing as well. A wide variety of means for producing components based on digital models exist, and all have reduced the time and cost required for a complete design cycle, which has improved the pace of innovation in many industries.

Generally, SFF is accomplished in a layerwise fashion, where a digital model is split into horizontal slices, and each slice is produced as a 2D image on a build surface. The sequential fabrication of these slices produces an aggregate collection of thin layers which collectively compose the 3 dimensional object represented by the digital model. In contrast to traditional fabrication techniques, such as Computer Numerically Controlled (CNC) machining, injection molding, and other means, SFF has markedly reduced production time and cost, and as such has been widely adopted for research and development purposes where low volume production with traditional means would be exceedingly expensive, Additionally, SFF devices generally require less expertise to operate when compared to CNC machines. The cost of individual parts produced from CNC machines is generally higher, owing to longer setup times and higher costs of machine operation. CNC-produced parts will often have stronger and more detailed features than SFF-produced parts, which may make them desirable for some applications. Until SFF techniques can produce parts with the resolution and functionality of CNC-produced parts, the usage of SFF in part production will remain constrained.

Powder Injection Molding (PIM) is a mass production technique which has been widely adopted as a means of producing high precision components in materials which would not traditionally be possible with other molding methods. A powder is blended with a resin binder to form an injection feedstock, which is injected into a mold, similar to plastic injection molding. The part produced is a powder composite part, called a "green" part. The green part is subjected to a process called debinding, in which most of the binder is removed. The resulting part is called a "brown" part. This brown part is then subjected to thermal treatment to cause the powder particles to sinter together. The part shrinks during this process, and voids between the powder particles are removed. They final result is a part with near full density. Further post-processing may be utilized to achieve over 99.5% density.

Some of the most common techniques for SFF include stereolithography (SLA), selective deposition modeling (SUM), fused deposition modeling (FDM), and selective laser sintering (SLS). These approaches vary in the type of materials they can use, the manner in which layers are created, and the subsequent resolution and quality of parts produced. Typically, layers are produced in a bulk material deposition method, or in a selective material deposition method. In techniques that employ a bulk deposition method for layer production, layer imaging is typically accomplished by a thermal, chemical, or an optical process. There is one technology, binder jetting, which utilizes inkjet print heads to deposit binder into a powder bed to produce a part similar to the previously described green part in a PIM process. This green part can be post-processed in the same manner to produce a final component. Unfortunately, due to imperfections in the process of producing the green part, the final components produced through this process often fail to meet tolerances for high precision applications.

SUMMARY OF THE INVENTION

Embodiments of a device for solid freeform fabrication and associated methods are herein disclosed for the production of components (e.g., plastic, metal; and ceramic parts) for a variety of applications.

In some embodiments, the SFF methods and devices disclosed herein may include a surface for receiving layers of material for production of a 3-dimensional solid representation of a digital model, a component or components for depositing the required layers of build material, and a component or components for imaging the build material into cross sections representative of data contained in a digital model. In one embodiment, the build material is composed of a particulate material and a photocurable resin material. The combination of these materials at the build surface overcomes the rheological constraints of aforementioned devices which have been used to produce powder composite parts. In another embodiment, imaging techniques utilized for layer imaging may involve the production of porous components which may be post-processed to produce a final component.

In addition, in some embodiments, the methods and devices described below may utilize particulate material (e.g., ceramic, plastic, or metal) as one of the build materials. Parts produced from this device may be treated after the build process is complete to facilitate bonding between adjacent particles. Such treatment includes but is not limited to thermal, chemical, and pressure treatment, and combinations of these. The results of this fabrication and treatment process include but are not limited to solid metal parts, solid ceramic parts, solid plastic parts, porous metal parts, porous ceramic parts, porous plastic parts, solid composite plastic parts, and composite parts comprising one or more types of material.

Material deposition of particulate material may be achieved through several means, including but not limited to spreading via a blade mechanism, electrostatic deposition on a transfer surface followed by deposition to a build surface, and electrostatic deposition to a compressing roller followed by deposition to the build surface. Infusion of a photocurable material (e.g., resin) may be achieved through infusion through the body of the component being built via a specialized infusion build platform.

Layer imaging may be achieved through several means, including but not limited to bulk imaging with a programmable planar light source, such as a DLP projector, or imaging with a rastering laser source utilizing a rotating prism to achieve a raster pattern.

Further, in one aspect a solid freeform fabrication device is provided such that composite objects composed of particulate material and resin material may be produced from digital data representative of a given three dimensional object.

In another aspect, a SFF device is provided which utilizes bulk deposition techniques for production of layers of material.

In another aspect, a SFF device is provided which combines particulate material with photocurable resin material for production of composite layers of material.

In another aspect, a SFF device is provided which allows for interchangeability of material components to enable the use of a wide variety of material combinations.

In another aspect, a SFF device is provided which achieves production of composite layers through in situ infusion of powder layers through an infusion build platform.

In another aspect, objects produced from an SFF device may be treated thermally, chemically, or mechanically to improve internal adhesion of material components.

In another aspect, treatment may include pressurization in a fluid chamber, exposure to a solvent, elevation of temperature to facilitate bonding of particulate material, elevation of temperature to relieve internal stresses derived from the build process, or partial sintering of particulate material followed by infusion with a tertiary material, which may include a ceramic and/or metal material with a lower melting point than the primary particulate material.

In another aspect, treatment may include draining a porous printed object of remaining liquid material, and infusing the porous object with a secondary material to fill its pores and provide a finished object.

In another aspect, a SFF device is provided which achieves fabrication of components by direct fusion of powder material using energy directed by a refractive rastering system.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 38 is a detailed view of the device described in FIG. 37.

DETAILED DESCRIPTION

Figure 1:
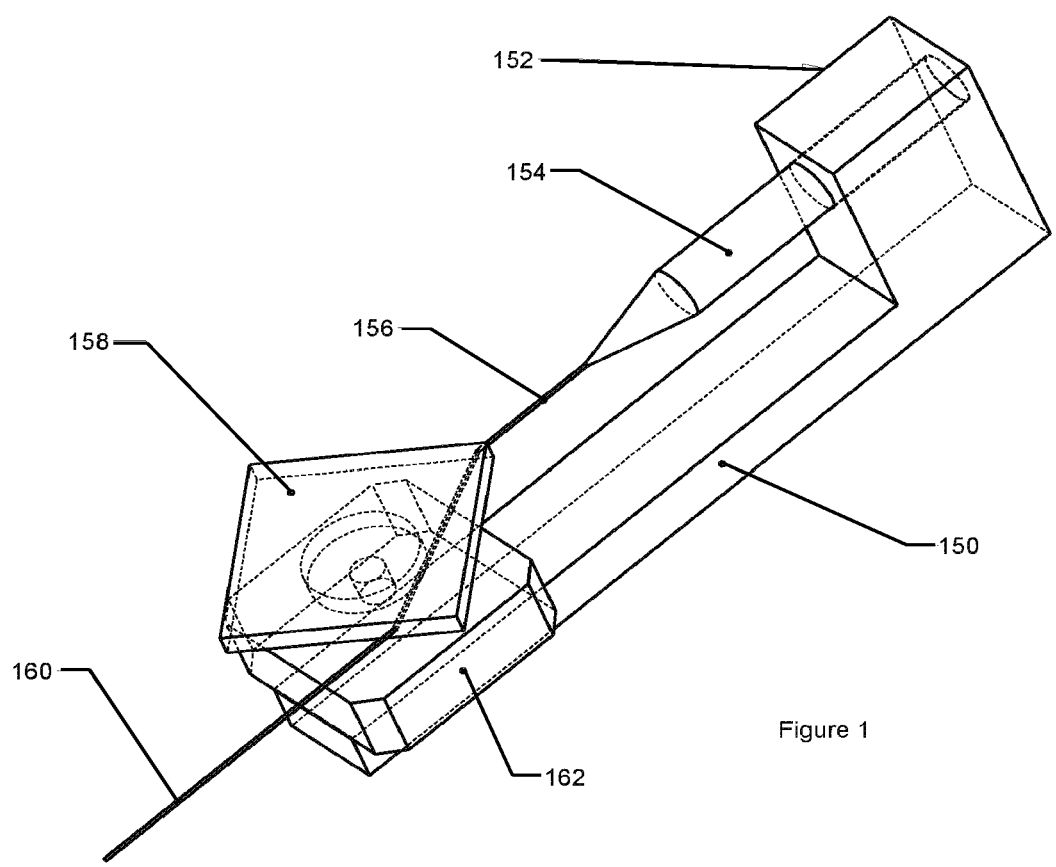
FIG. 1 is a right front perspective view of a refractive rastering mechanism for use with a device for solid freeform fabrication according to an embodiment of the presently disclosed subject matter.
Figure 2:
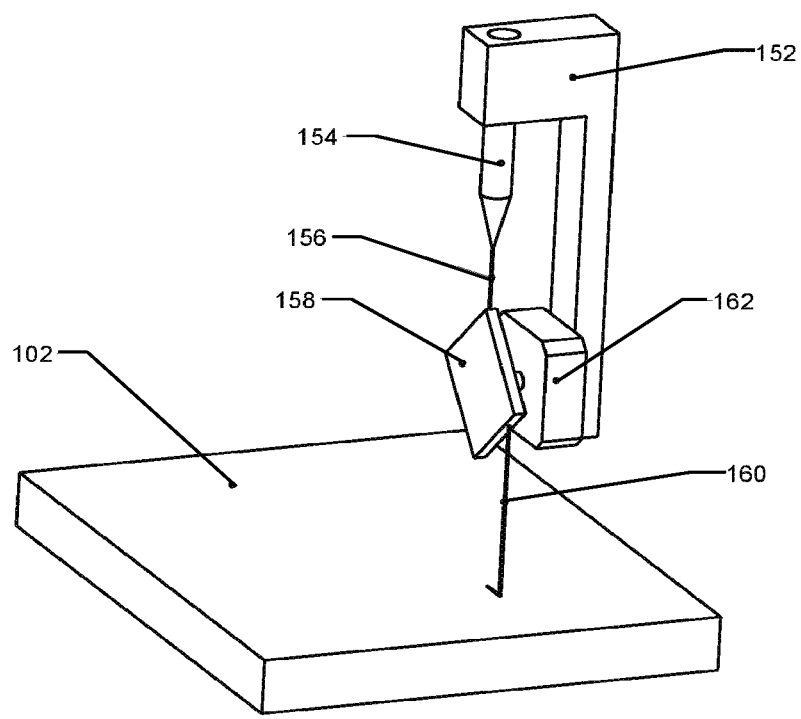
FIG. 2 is a right front perspective view of a solid freeform fabrication machine utilizing the rastering mechanism in FIG. 1.
Figure 3:
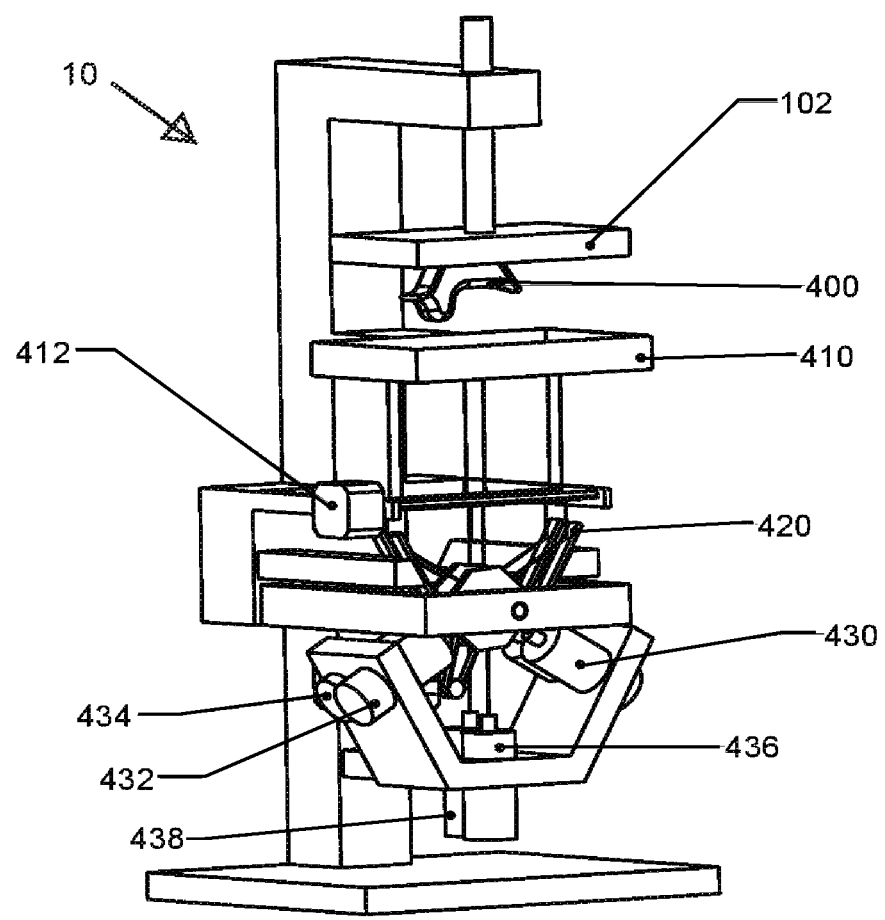
FIG. 3 is a left front perspective view of a solid freeform fabrication machine utilizing a refractive rastering mechanism in a second configuration according to an embodiment of the presently disclosed subject matter.
Figure 4:
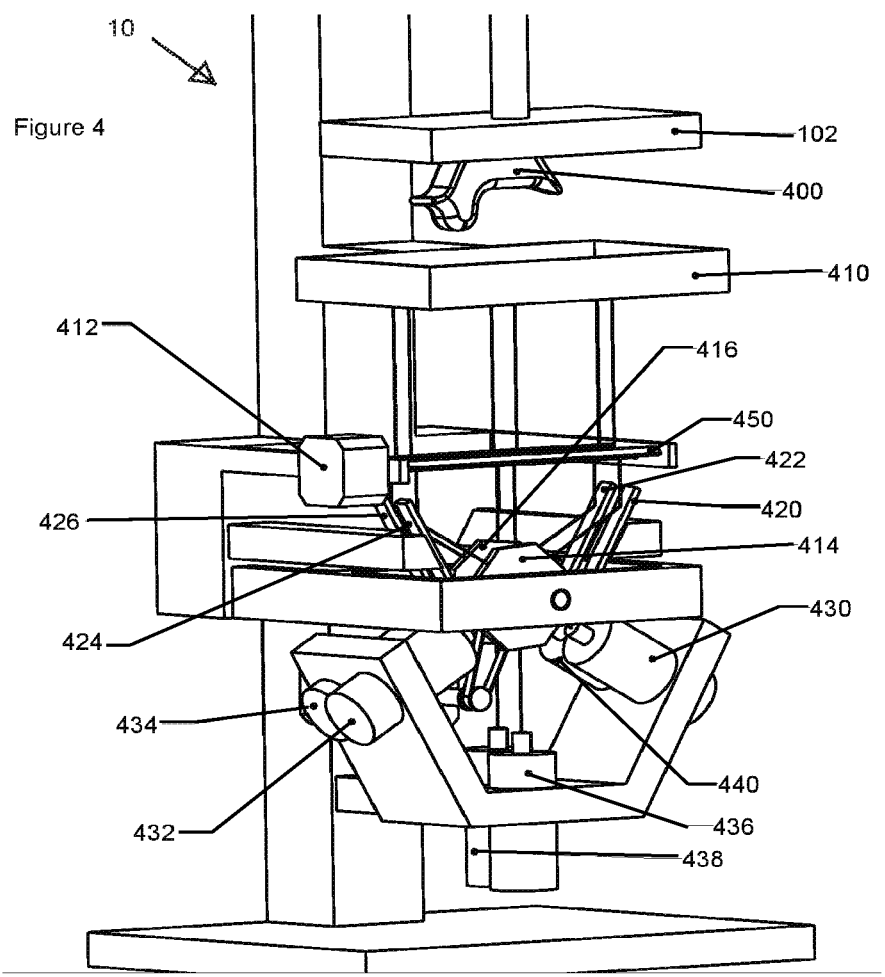
FIG. 4 is a left front detailed view of the machine in FIG. 3.
Figure 5:
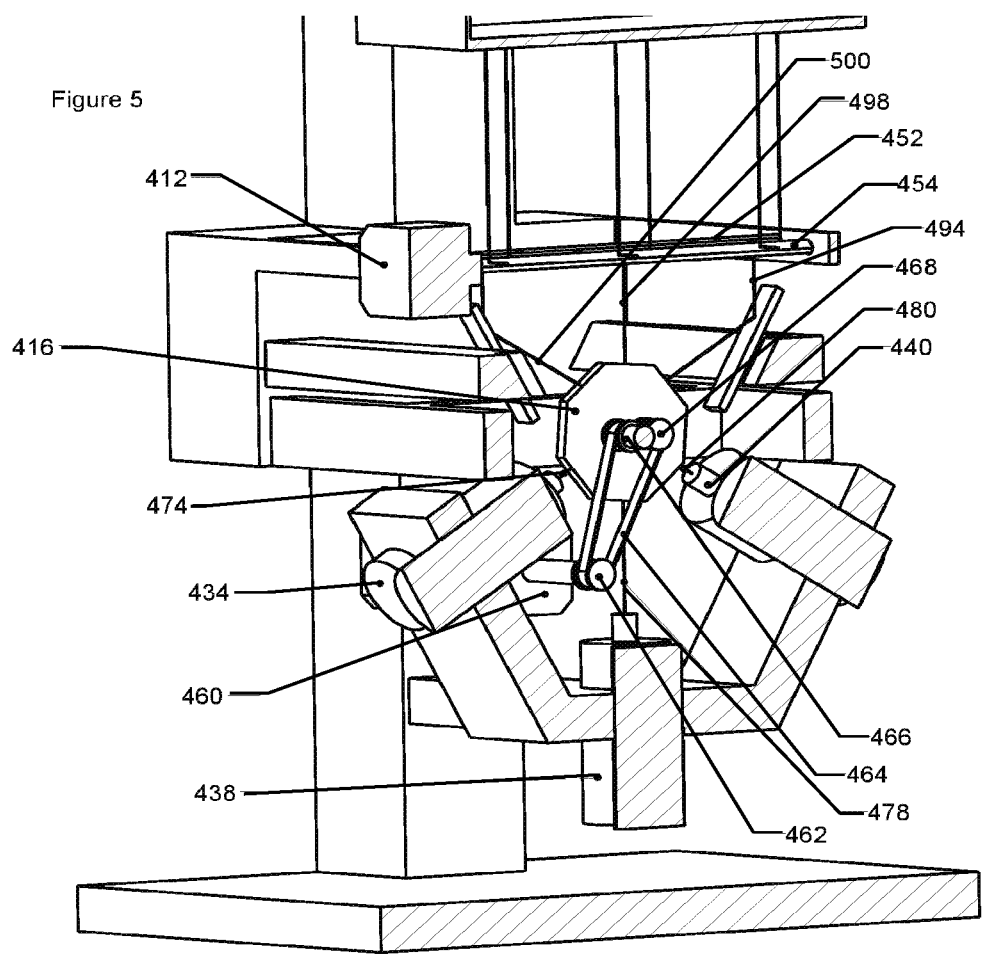
FIG. 5 is a section view of the machine in FIG. 4.
Figure 6:
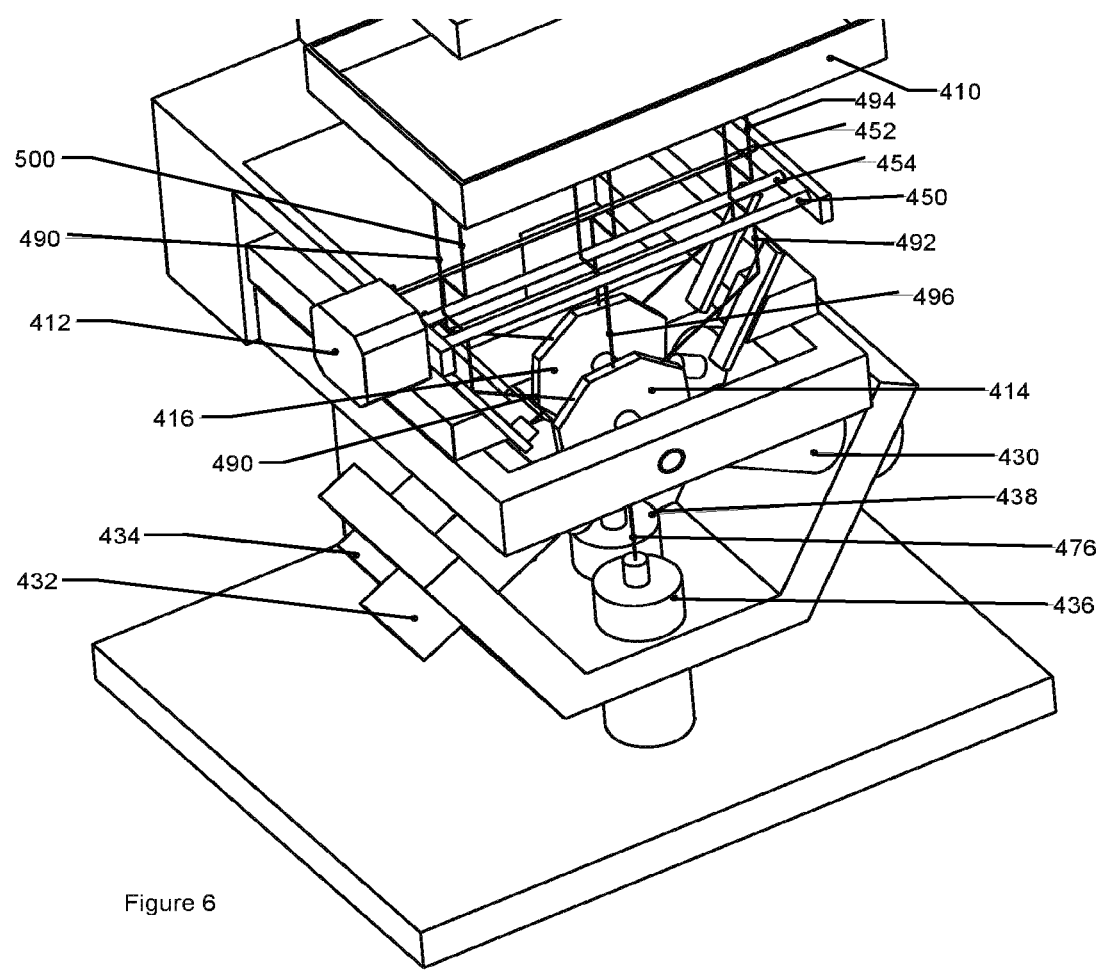
FIG. 6 is an elevated detailed view of the machine in FIG. 3.
Figure 7:
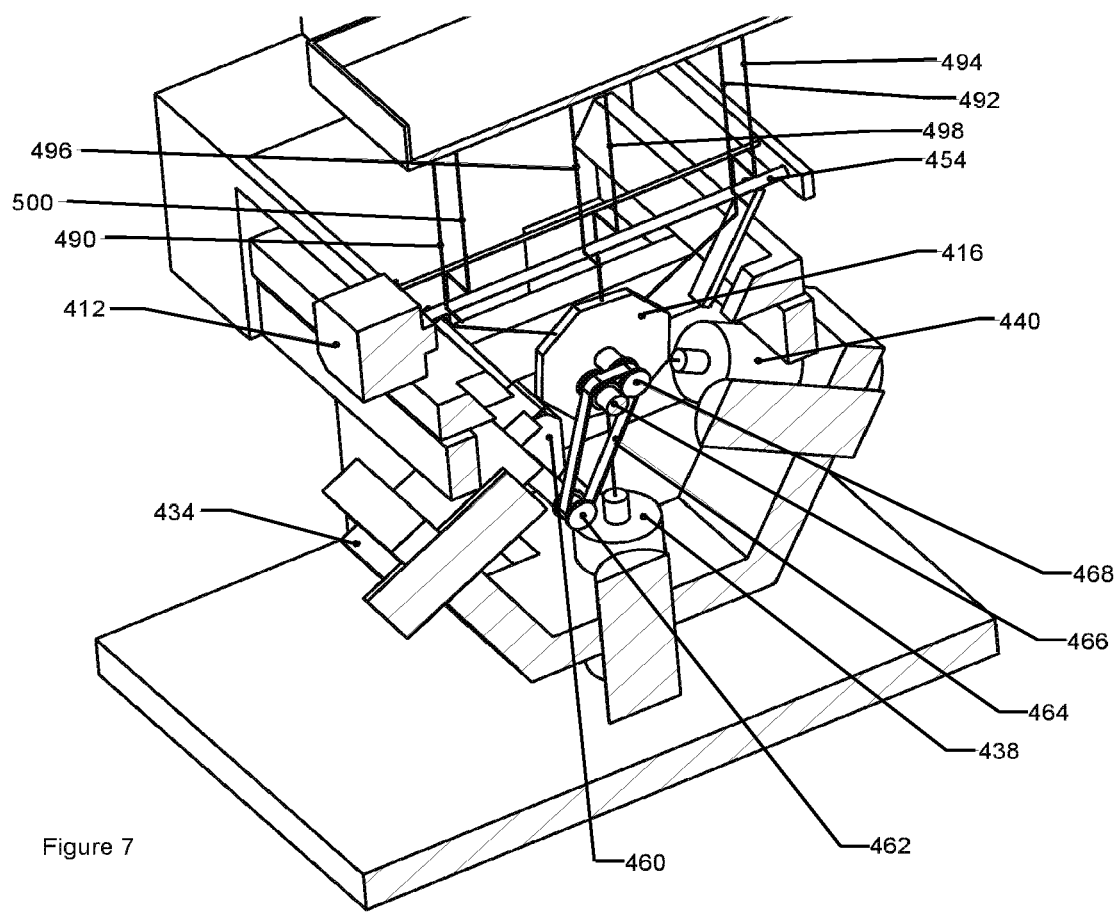
FIG. 7 is a section view of the machine in FIG. 6.
Figure 8:
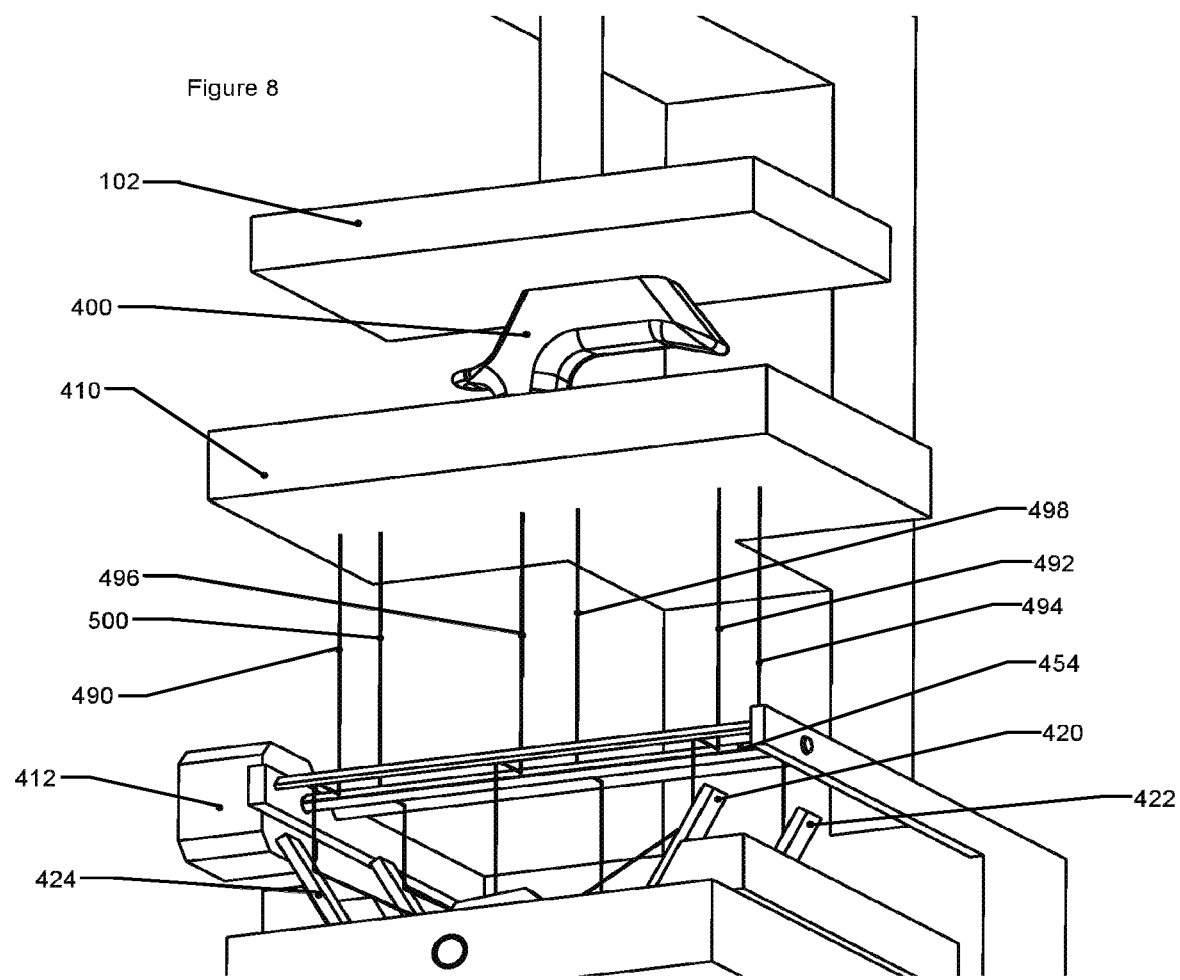
FIG. 8 is a right detailed view from below of the machine in FIG. 3.
Figure 9:
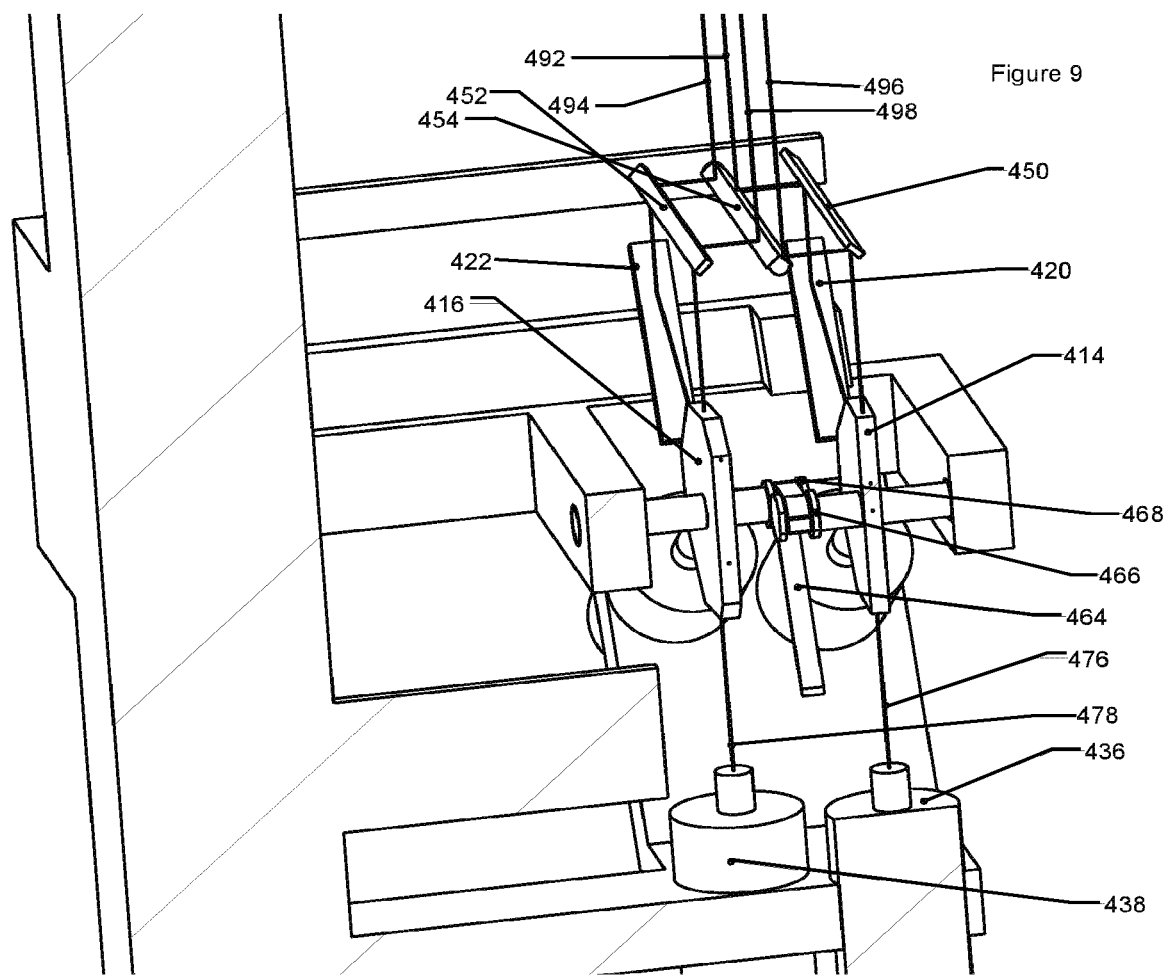
FIG. 9 is a left elevated section view of the machine in FIG. 3.
Figure 10:
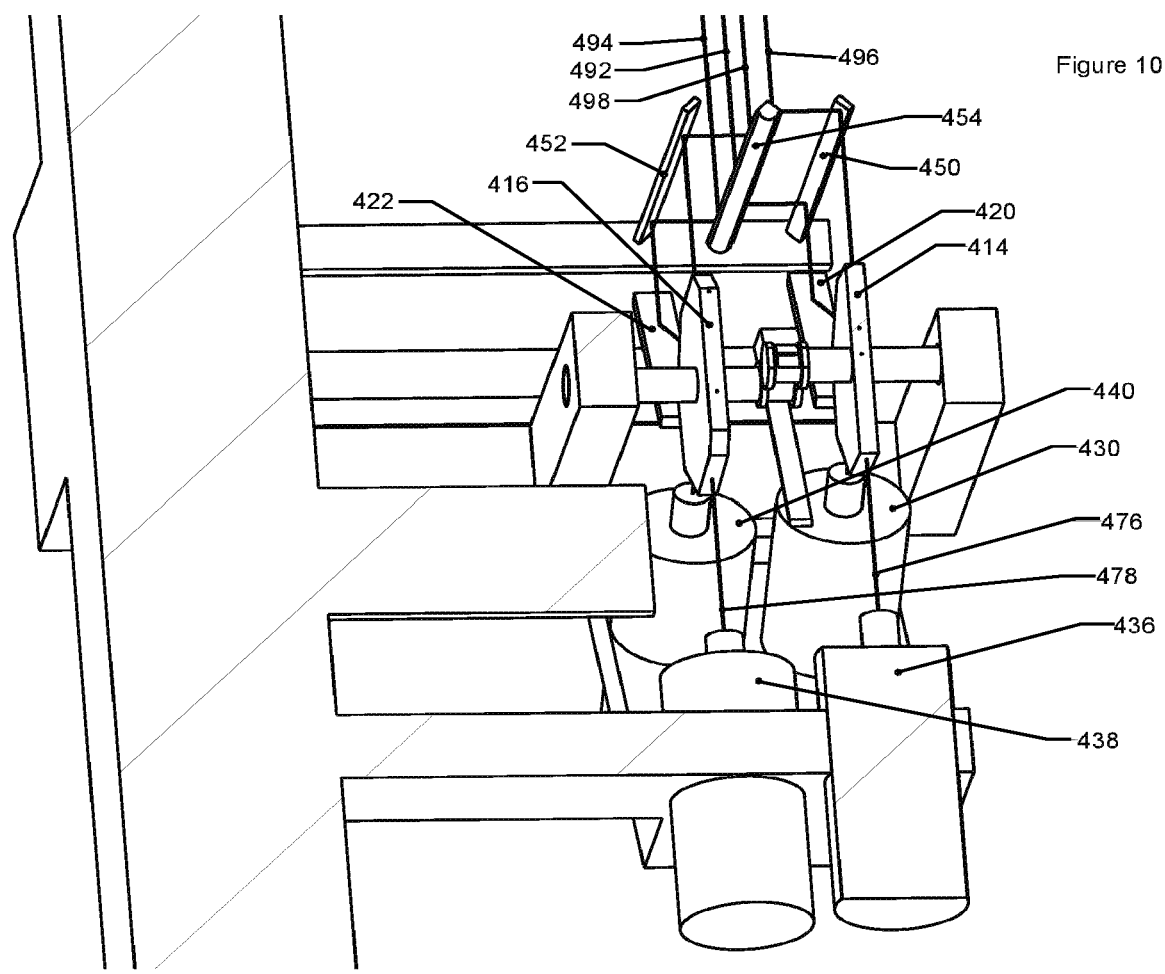
FIG. 10 is a left section view from below of the machine in FIG. 3.

The present subject matter provides systems, devices, and methods for solid freeform fabrication for the production of components (e.g., plastic, metal, and ceramic parts) for a variety of applications. In one aspect, the present subject matter provides an imaging device for use in imaging layers of a photocurable material. A common technique for producing an image using a laser to cure layers of resin in an SLA machine is to raster the laser across the build surface with the raster lines beginning and ending at the boundaries of cross sections of the object being built. FIGS. 1-2 depict a rastering mechanism (150) for use in imaging layers of photocurable resin. As shown in FIGS. 1 and 2, a beam (156) of collimated radiation is emitted by a source (154). The beam (156) enters a prism (158) and is refracted. Upon exiting the prism (158), a second refraction occurs, and the result is a displaced beam (160). The prism (158) in this case is a square section with thickness exceeding the beam (156) diameter, but may in general be a polygon with an even number of parallel faces. In some instances, faces of the prism (158) may not need to be parallel, depending on the desired refraction and displacement behavior. In this embodiment, the prism (158) is rotated by a rotary actuator (162) which causes the displaced beam (160) to raster across the build surface (102). In this way, one or more of prism rastering modules (150) can be translated across the build surface (102) as shown in FIG. 2, and bulk imaging can thereby be achieved while the sources (154) are switched on and off according to the cross section being imaged.

In some embodiments, the beam displacement capacity of a refractive rastering mechanism is related to the size of the refractive prism being used. In general, the total line width produced by the previously described mechanism will be less than the space occupied by the rotating prism, which presents a geometric challenge when trying to use multiple rastering mechanisms to cover a build area. FIGS. 3-10 show one possible configuration for an SLA machine, generally designated (10), which overcomes this challenge.

In the configuration of FIGS. 3-10, SLA machine (10) includes a build platform (102), a build vat (410), and an imaging system. The build platform (102) lowers into the build vat (410) which contains photocurable resin. A layer of material is imaged, and the build platform (102) moves upwards to allow resin to flow under that layer such that the next layer may be imaged. This process repeats until a component (400) is produced.

As previously mentioned, any polygonal prism with an even number of edges may be readily used in a continuous rotation rastering mechanism. In this instance, in the configuration illustrated in FIGS. 3-10, two octagonal prisms (414, 416) are used. Each prism is used to raster three separate beams. In a multi-beam rastering mechanism, more beams will widen the area that may be imaged by a given prism, but it will also complicate the geometry of mounting and aligning the beam sources. In some configurations, this arrangement will in general increase the optical path length of a given beam source, in particular where sources are mounted further from the prism in order to accommodate all sources within the module, which will in turn increase the precision requirements for the beam sources. The number of beams passed through a given prism can be chosen to provide complete imaging of the build area without putting undue precision requirements on the beam sources. The size of the beams utilized can be configured such that any interference between beams as they pass through these prisms has no effect on the output from each rastering mechanism.

In particular, for example, in a configuration designed for producing mesoscale and microscale components, it is not necessary to use a beam diameter that would result in interference between beams within the prism. If such an application is desirable, however, the thickness of the prism can be configured such that it allows the beams to be staggered such that they pass by each other in a skew fashion within the prism without intersection, and without a negative impact on the function of the other components of the module. Referring again to the configuration shown in FIGS. 3-10, a first prism (414) can be used to raster a first set of 3 beams from 3 beam sources (430, 432, 436). A second prism (416) can be used to raster a second set of 3 beams from 3 beam sources (434, 438, 440). These prisms can be offset such that the three rastering beam patterns from each prism collectively image the entire build region, as will be further explained below. In the illustrated embodiments, rotation of these prisms (414, 416) is achieved through a belt and pulley system, but may in general be achieved through any means of rotary actuation. In this instance, a motor (460) drives a pulley (462) which drives a belt (464) which in turn transmits rotary motion to two other pulleys (466, 468) which drive the rotation of the prisms (414, 416). Angular position of these prisms may be measured by encoders (not depicted) or other electronic angular measurement device.

To illustrate the functionality of this laser and prism array, particular attention will be paid to one laser source (440) and the beam it produces (480). This beam (480) is incident upon the second rotating prism (416) and produces an exigent displaced beam (500). The exigent beam (500) is reflected by a mirror (426) such that the reflected beam is aligned substantially vertically. In general, vertical alignment is not strictly required, as long as the six exigent beams are proximately aligned with one another in order to simplify the process of reflecting them with a rotating mirror on to the build surface. The beam (500) is reflected by a second mirror (452) onto a panning mirror array (454).

The other five beam sources (430, 432, 434, 436, 438) can be subjected to a similar process, with the exception that two exigent beams (496, 498) do not require mirrors to achieve vertical alignment, as they are already vertical. In the illustrated configuration, three other mirrors (420, 422, 424) are used to achieve vertical alignment for three other exigent beams (492, 494, 490) respectively. The previously mentioned second mirror (452) reflects three of the exigent, vertically aligned beams (494, 498, 500) onto the panning mirror array (454) while another mirror (450) reflects the remaining three exigent, vertically aligned beams (490, 492, 496) onto the panning mirror array (454).

Each beam will raster over a specified region on the surface of the build vat (410) in order to image part of the build area. In order to image the entire build area, it is desirable to have adjacent raster regions overlap slightly, and this overlap can be corrected in the control software during calibration. This will guarantee the ability to fully image the build area, accounting for the geometric tolerances of the components of the machine. Since two beams (494, 500) use mirrors (422, 426) to achieve vertical alignment in this configuration, there is no easily achievable configuration in which the edges of these mirrors (422,426) would not interfere with creating an overlap with the raster region defined by the central beam (498) exigent from this prism (416). As such, this configuration has these beams (494, 498, 500) spaced apart such that the gap between each raster region is slightly narrower than a given raster region. A second set of beams (490, 492, 496) from the other prism (414) is offset slightly in order to cover these gaps and provide for complete imaging of the build area.

The panning mirror array (454) can be actuated by a motor (412) such that its rotation causes the rastering beams to traverse the entire build area. In some embodiments, position data for one or more of the prisms (414, 416) and panning mirror array (454) can be measured in real time, used to calculate the positions of each of the six beams (490, 492, 494, 496, 498, 500), and modulate each source (430, 432, 434, 436, 438, 440) in order to image the component (400) that is being produced on the build platform (102).

Figure 11:
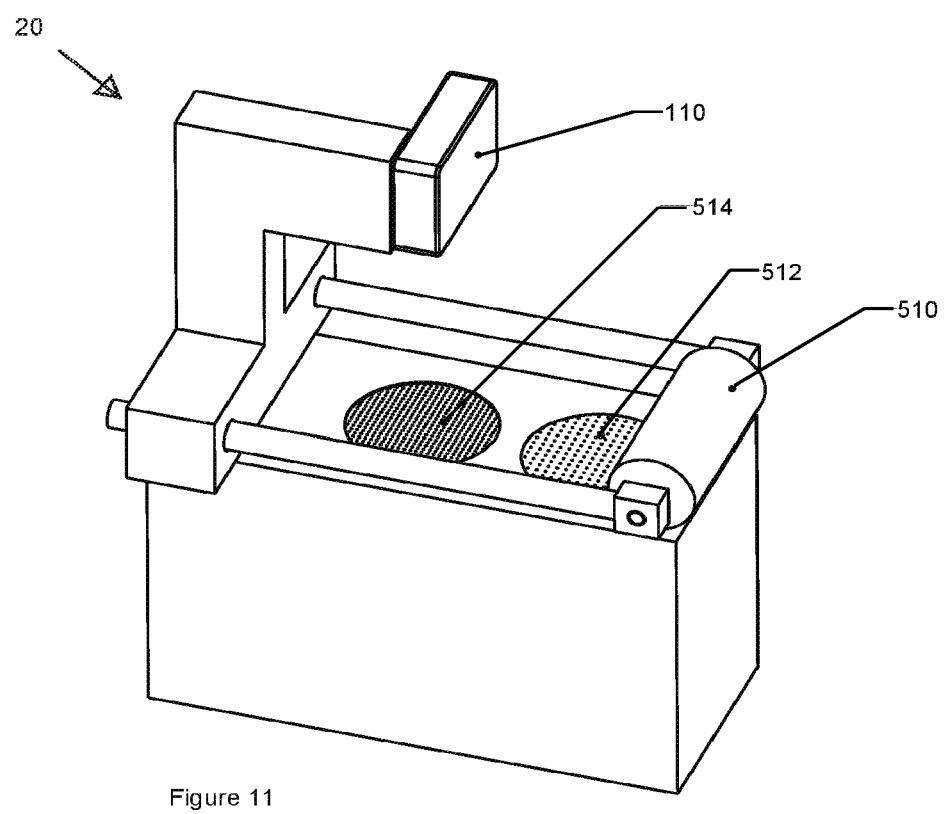
FIG. 11 is a left elevated perspective view of a first configuration of a powder composite fabrication machine in a first position according to an embodiment of the presently disclosed subject matter.
Figure 12:
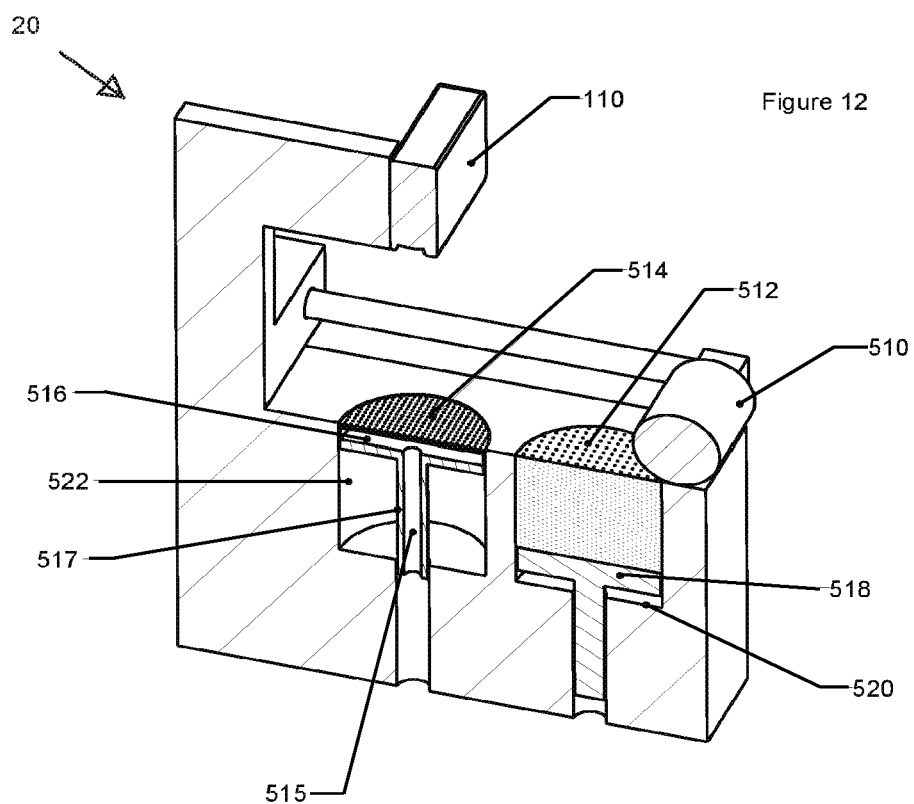
FIG. 12 is a section view of the machine in FIG. 11.
Figure 13:
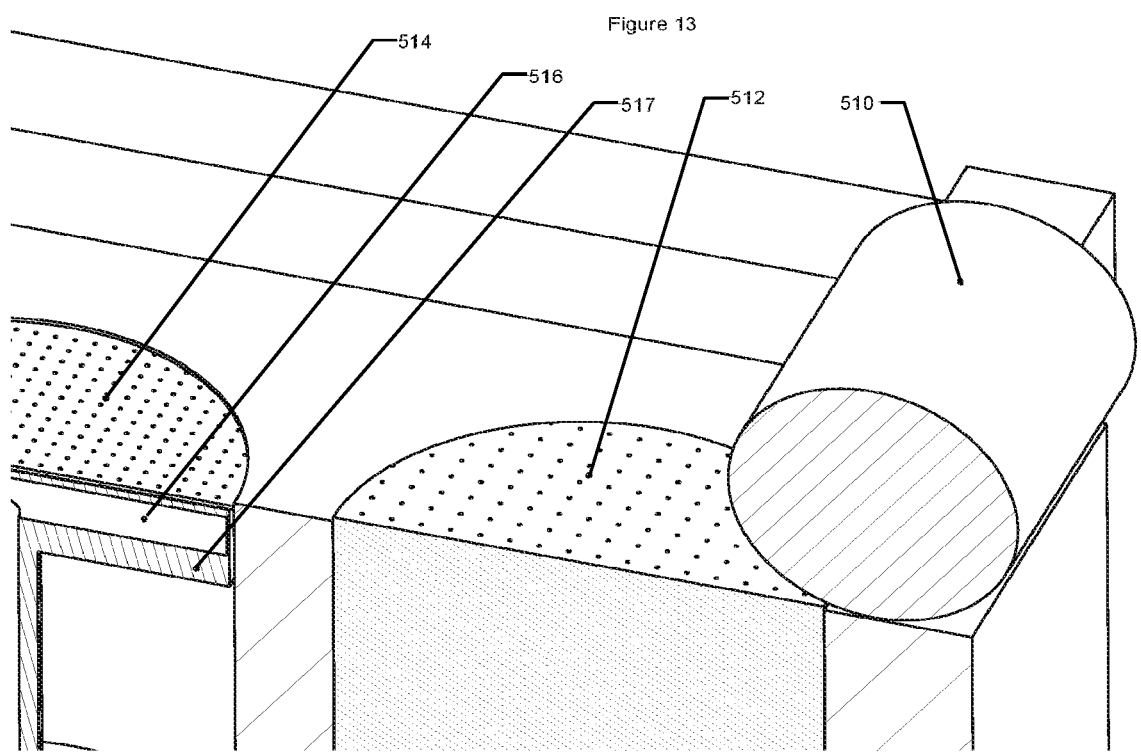
FIG. 13 is a detailed view of the machine in FIG. 12 in a second position.

In another aspect, the presently-disclosed subject matter provides SFF systems, devices, and methods that form components from a powder composite material combination. Such systems, devices, and methods can be use with any of a variety of imaging systems, including but not limited to the prism rastering systems discussed above. FIGS. 11-17 depict a powder composite fabrication machine (20) in a first configuration. FIGS. 11 and 12 depict this machine (20) in its first position. In some embodiments, machine (20) includes a powder supply chamber (520) which contains a powder supply piston (518) and powdered material (512) for fabricating an object. A build chamber (522) contains a build platform (517) with an internal flow channel (515) and distribution chamber (516) for infusing resin into powder. In some embodiments, a filter (514) can be placed on top of the build platform (517) to prevent powder from flowing backwards into the array of holes on top of the build platform (517). These holes are used to infuse the powder (512) with resin.

The powder supply piston (518) is raised to a second position which causes the powder (512) to emerge from the powder supply chamber (520). Powder can be transferred to the build platform (517) by a powder transfer device, such as a roller (510). In some embodiments, this roller (510) may utilize counter-rotation or electrostatic transfer to move powder (512) from the powder supply chamber (520) to the build platform (517). There may be excess powder lost in this process; managing excess powder may be accomplished by any of a variety of means known to those having skill in the art. In addition, although the embodiments shown and described use roller (510) as the powder transfer device, those having ordinary skill in the art will recognize that the concepts disclosed herein are equally applicable with any of a variety of other material delivery/deposition devices known in the art (e.g., a recoater blade, electrostatic powder transfer without a roller).

Figure 14:
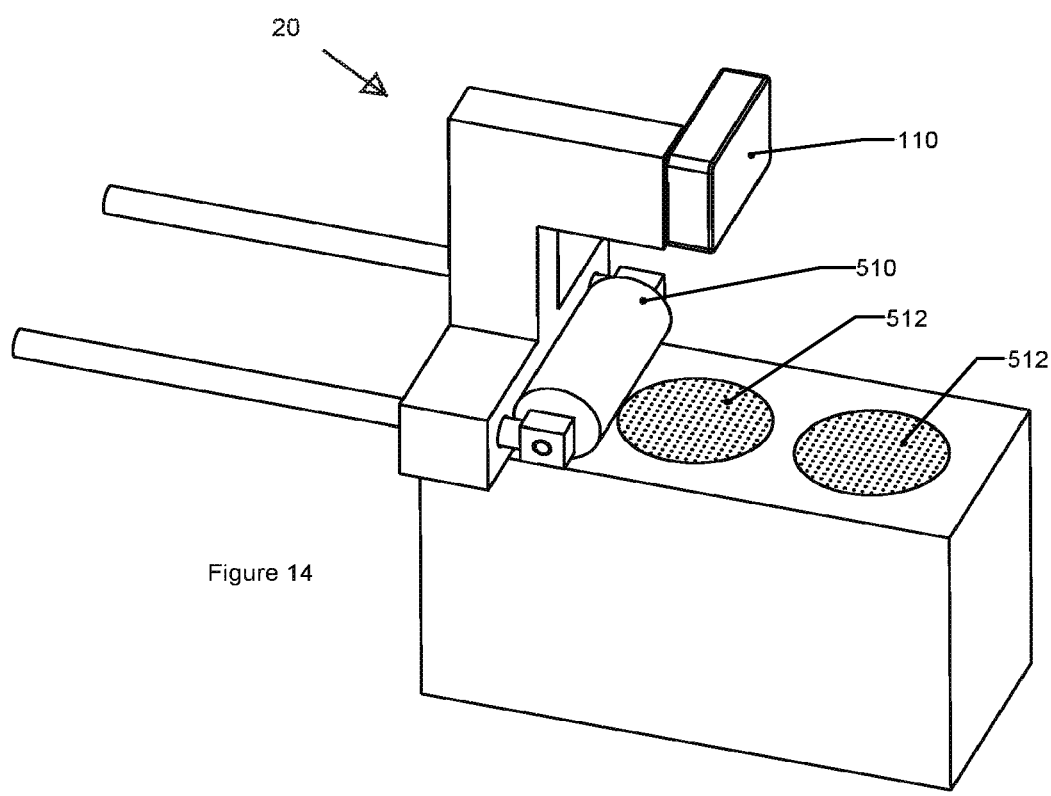
FIG. 14 is a left elevated perspective view of the machine in FIG. 11 in a third position.
Figure 15:
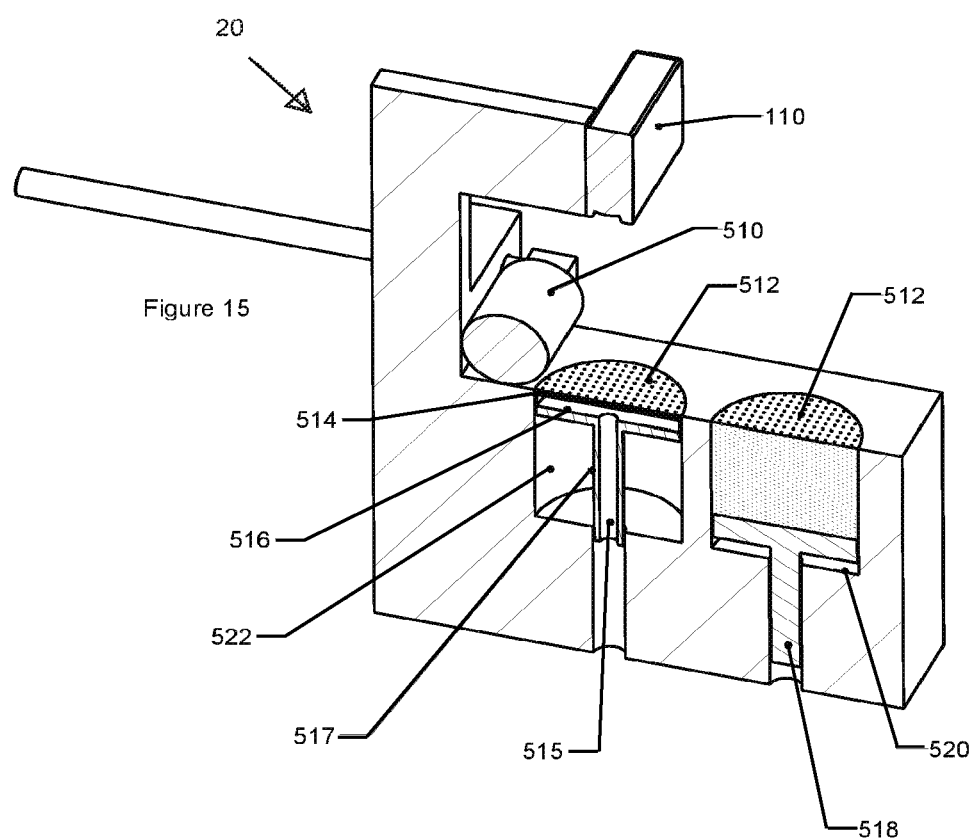
FIG. 15 is a section view of the machine in FIG. 14.

FIGS. 14 and 15 depict the machine in a third position, with the powder transfer device (e.g., roller (510)) having been fully actuated to deposit a layer of powder (512) on the build platform (517). In this position, resin can be pumped into the flow channel (515) in the build platform (517) and into the distribution chamber (516) which allows the resin to access all of the holes in the top of the build platform (517). The resin flows through the filter (514) and soaks into the powder (512). A combination of forced flow and capillary effects causes complete infusion of the powder layer. Since this powder layer was produced independently of the resin infusion process, and the resin infusion process is controlled such that it does not significantly impact the density of the powder layer, the density of the powder layer may be determined by the parameters of the powder deposition process, and much higher powder loading densities may be achieved than in existing powder SFF technologies.

Figure 16:
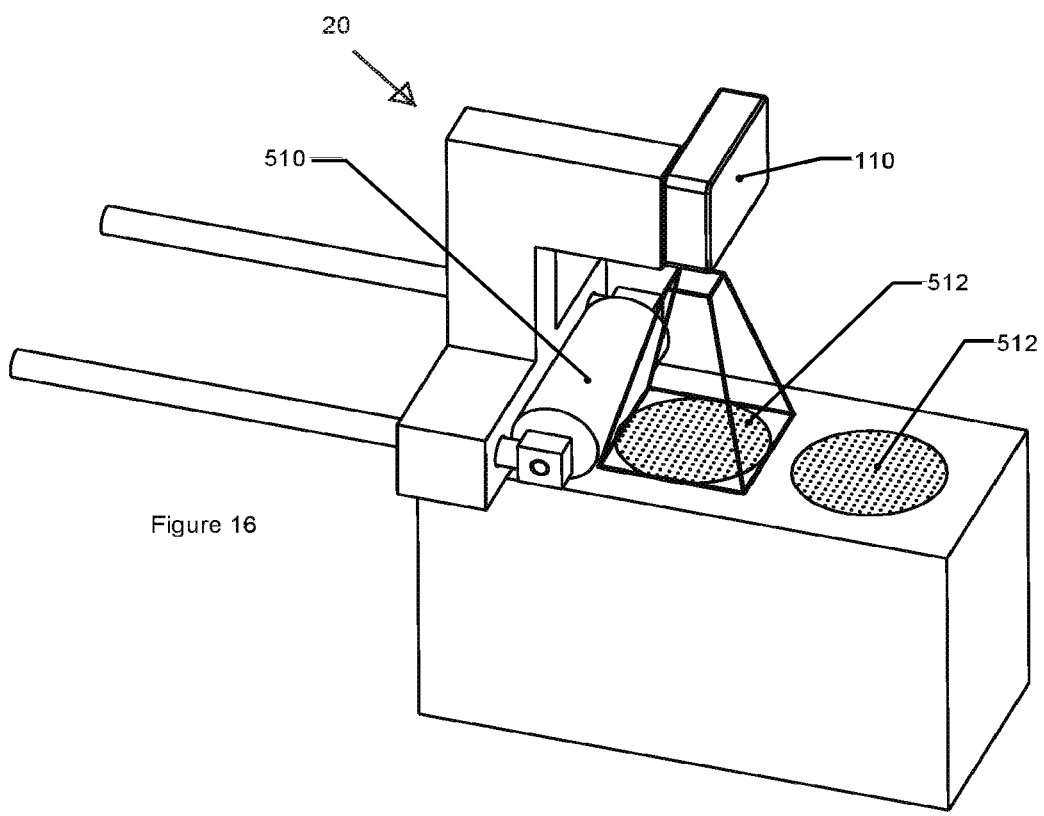
FIG. 16 is a left elevated perspective view of the machine in FIG. 11 in a fourth position.
Figure 17:
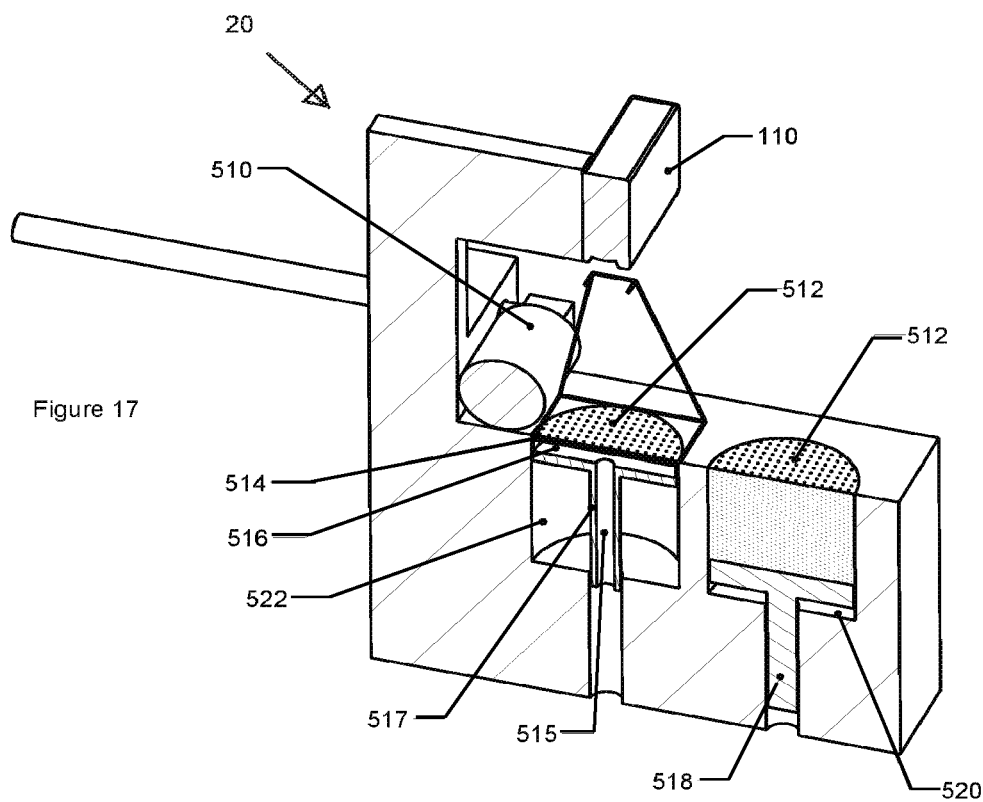
FIG. 17 is a section view of the machine in FIG. 16.

As shown in FIGS. 16 and 17, the infused layer may be imaged with a programmable planar light source (110), such as a DLP projector, with one or more other optical imaging device, including the refractive rastering system previously described, or with a combination of different light sources. In order to allow the infusion process to continue to subsequent layers, the cross-sectional image that is projected on the first layer of infused powder can be designed to allow the flow of resin to infuse subsequent layers. It can therefore be advantageous that these layers are imaged such that a porous structure is fabricated. If the layer were imaged as a solid cross section, the resulting structure may restrict the flow of resin to subsequent layers. Exemplary imaging processes that are able to achieve such a porous structure will be described below with reference to FIGS. 35-38.

Figure 18:
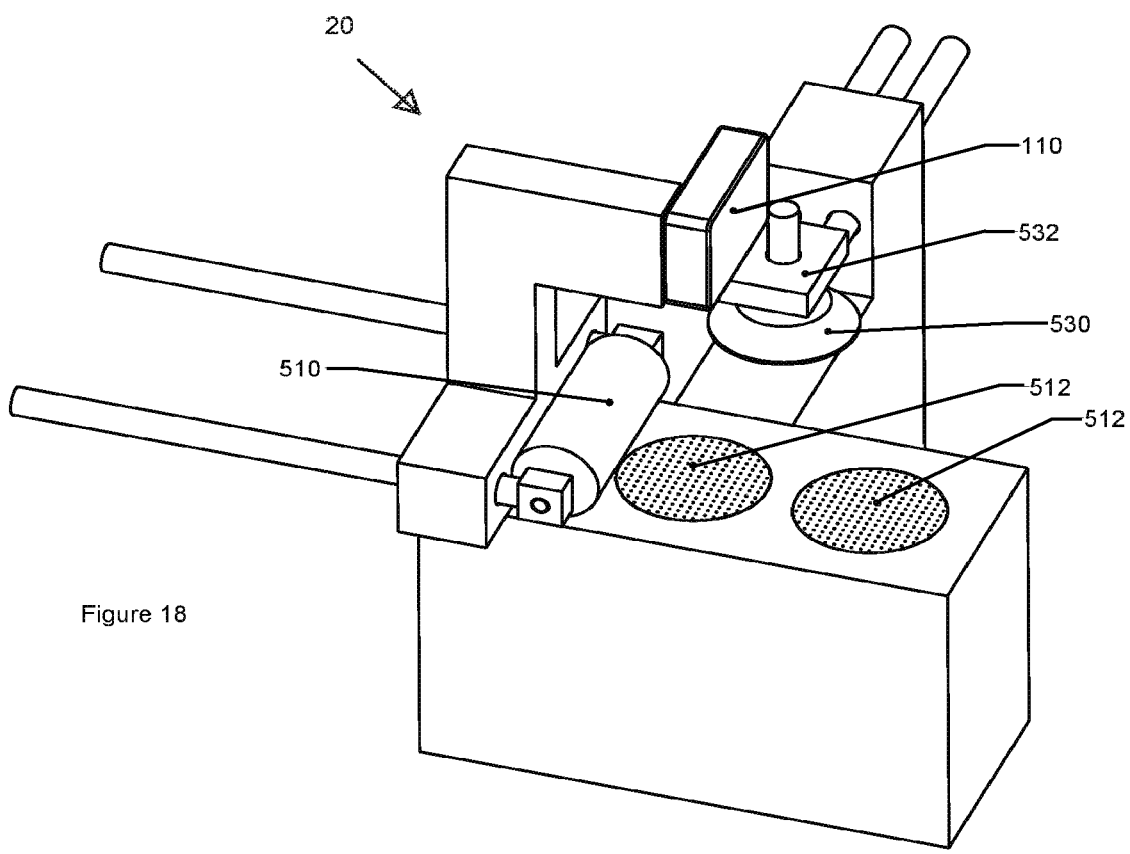
FIG. 18 is a left elevated perspective view of a second configuration of a powder composite fabrication machine in a first position according to an embodiment of the presently disclosed subject matter.
Figure 19:
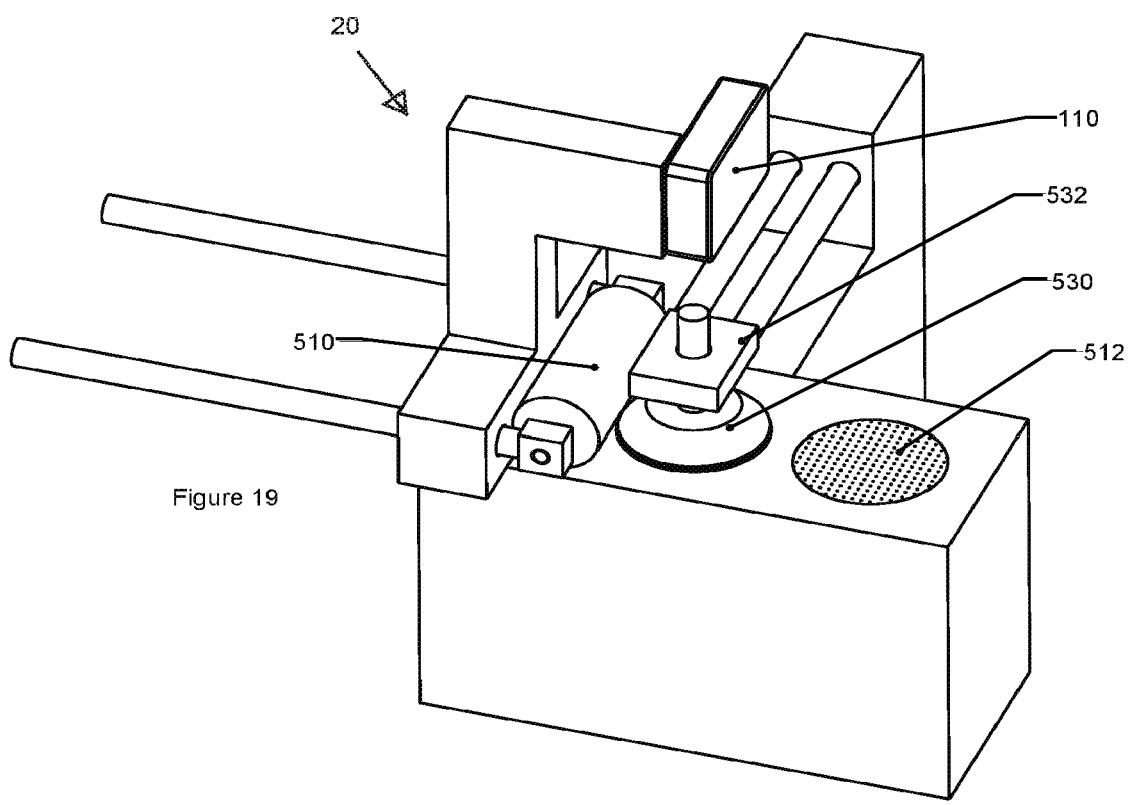
FIG. 19 is a left elevated perspective view of the machine in FIG. 18 in a second position.

FIGS. 18 and 19 depict a second configuration of the previously described powder composite SFF machine (20). In this configuration, a compressing piston (530) and extension arm (532) are used to densify the powder layer (i.e., to have a density that is greater than a free density after deposition) prior to infusion. Depending on the powder deposition parameters, the ideal density of powder may not be achieved during the deposition process, and additional means of powder densification may be desired. In this instance, the piston (530) is used to compress the deposited powder (512) to increase the volumetric powder loading density of the resulting component. This may improve the properties of the component as they pertain to post-processing, including but not limited to sintering or other thermal and/or chemical treatments.

Figure 20:
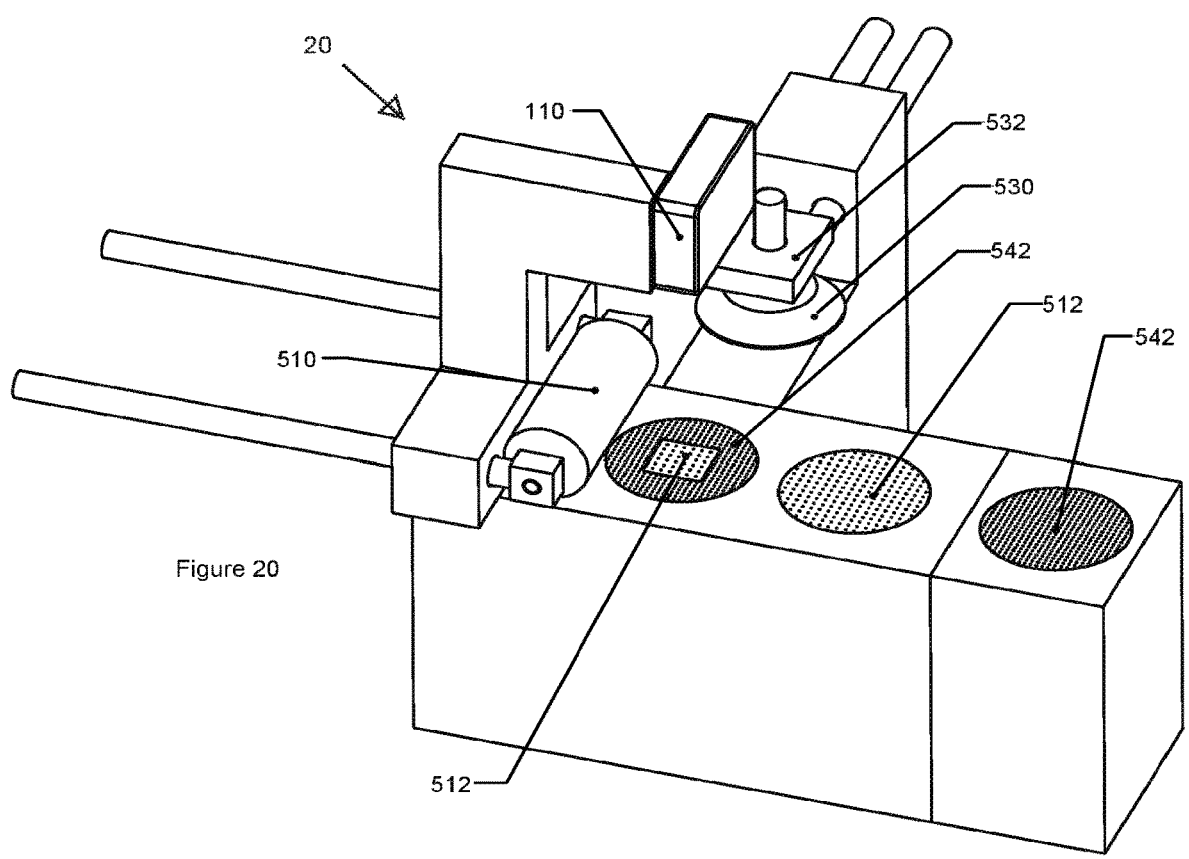
FIG. 20 is a left elevated perspective view of a third configuration of a powder composite fabrication machine according to an embodiment of the presently disclosed subject matter.
Figure 21:
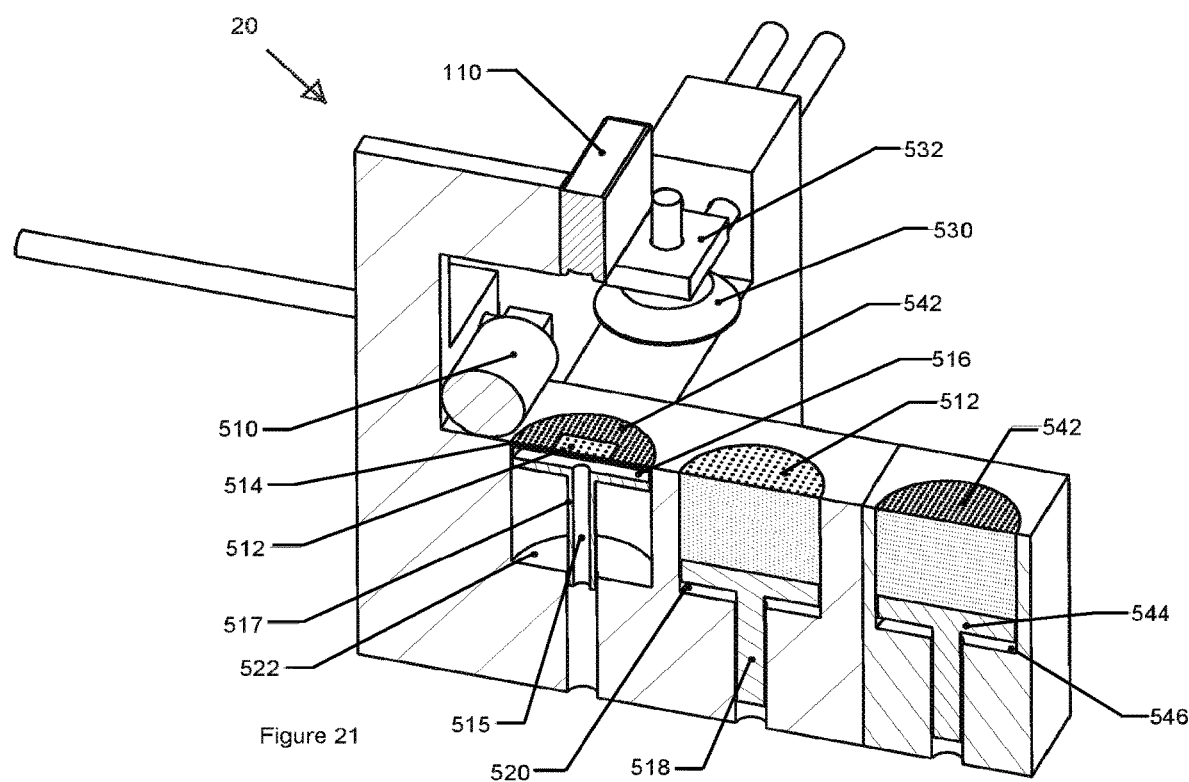
FIG. 21 is a section view of the machine in FIG. 20.

FIGS. 20 and 21 depict a third configuration of the previously described powder composite SFF machine (20). In this configuration, an additional powder supply chamber (546) is used; this source (546) provides support powder (542) via a support powder piston (544) whereas the original build powder (512) is only used for the body of the object being built. In this instance, the roller (510) is used as an electrostatic imaging device, depositing build powder (512) and support powder (542) in the appropriate shape to achieve the desired final object. The layer may be infused and imaged as previously described, with possible additional densification as previously described.

The advantage of using two powder sources and electrostatic imaging, rather than a single powder source and optical imaging, is that multiple types of powder may be used. For example, it may be desirable to have the build powder be a polymer with desirable properties for investment casting, and to have the support powder be graphite or other high temperature material, such that the printed object can be directly used for investment casting without modification. Further, it may be desirable to use metal powder as the build powder, and graphite or other high temperature material as the support powder, such that the printed object may be placed in a furnace for sintering without additional post-processing or cleaning. The graphite in this instance would continue to support the object during the sintering process, and be readily removable following the sintering process since the resin binder would be burned out during this process. Further, it may be desirable to use a metal powder as the build material, and a non-metallic (e.g., plastic or ceramic) powder as a support material, which would be removed during the debinding process. Further, it may be desirable to use more than two types of powder, such as steel powder for the structure of an object, ceramic powder as an insulator, silicon or other semiconductor powder for functional electronic components, and copper or other metallic powder for conductive pathways. Powder size and composition may be selected such that the green part may be sintered at one sintering temperature; the benefit of this process would be the ability to integrate functional electronic systems into a printed part.

It may be desirable to include additives in the resin in some applications. For instance, it may be desirable to include an electrolytic or otherwise conductive additive with the resin, to allow the system to control the electric charge at the build surface. This conductive additive can improve the operation in the implementation of an electrophotographic powder deposition system, for example, particularly if the powder being used is not otherwise electrically conductive. Additionally, it may be desirable to include a surfactant, to alter the wetting properties of the resin mixture as it permeates the powder substrate. This alteration may increase the speed of infusion and expedite the fabrication process overall.

Figure 22:
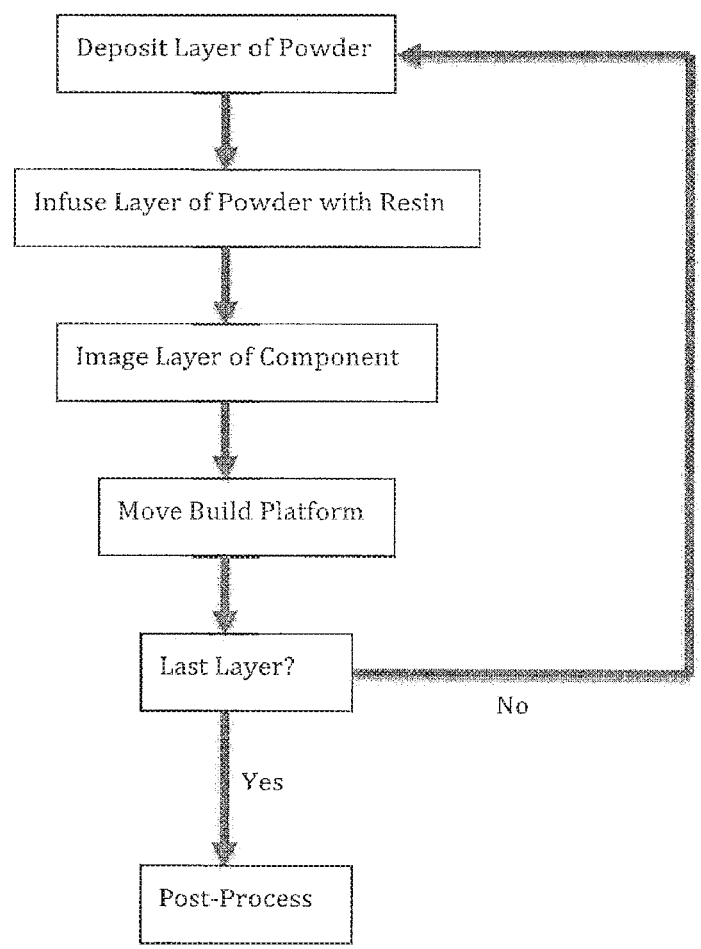
FIG. 22 is an algorithmic flowchart of a first method of fabricating powder composite components according to an embodiment of the presently disclosed subject matter.

FIG. 22 depicts an algorithmic flow chart which details the powder fabrication process described previously. In general, any mechanism which produces a bulk powder layer, infuses that powder layer in situ in a non-selective manner, images the layer to produce a porous layer that is representative of a cross section of the object being built, and repeats this process until the full object is built, will achieve the benefits previously described. This object may be post processed with additional curing to cure the remaining fluid resin within the porous object to convert it to a solid object. It may also be post processed via a sintering treatment to partially or completely remove the resin binder and partially or completely densify the powder within. If the part is partially sintered, the new porous part may be filled with a tertiary material (e.g., a metal of lower melting point than the powder used in the original part) to create a non-porous final component.

Figure 23:
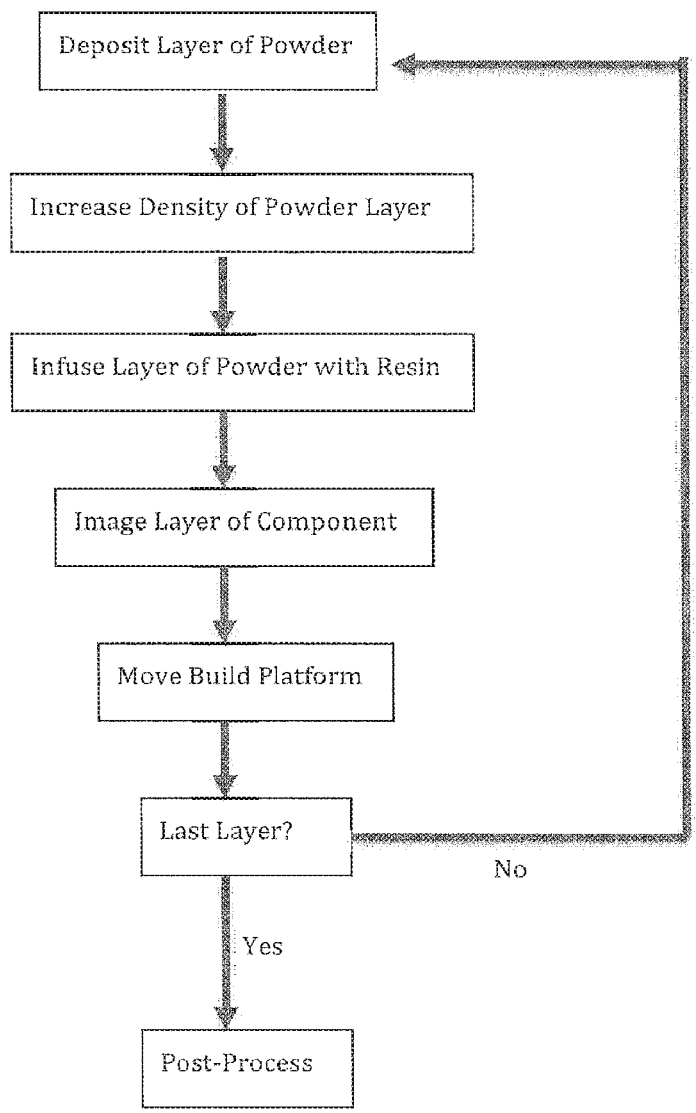
FIG. 23 is an algorithmic flowchart of a second method of fabricating powder composite components according to an embodiment of the presently disclosed subject matter.

FIG. 23 depicts an algorithmic flow chart which details the additional process of increasing the density of the powder layer in the previously described fabrication method in FIG. 21. In general, volumetric powder loading densities of 50-60% are common in pre-fabricated resin/powder mixtures that utilize dispersants to maintain the suspension of powder particles in the resin substrate. However, in powder metallurgy, densities in excess of 80% are commonly targeted in green parts that are intended to be sintered into fully dense final components. Densities greater than 50-60% (e.g., and in some embodiments in excess of 70%) may be achieved with a variety of powder deposition methods that do not involve resin; in order to achieve preferred green part powder loading densities, additional densification of powder layers may be required. In general, it is desirable to achieve as high a particle loading density as possible in the green part that is digitally fabricated. However, this is constrained by the fact that compression of powder particles can cause adhesion, which would interfere with the process of removing excess uncured material from the green part after fabrication. The process of removing excess material may be aided by a variety of methods, including but not limited to agitation, sonication, or treatment with a solvent or other chemical compound. In general, the highest particle loading density that does not correlate with a reduction in ability to remove excess material during post-processing is the most desirable particle loading density. This may be achieved through a variety of means, including but not limited to the previously described powder compression mechanism. In general, compression and infusion parameters may be selected such that one process does not interfere with the other.

Figure 24:
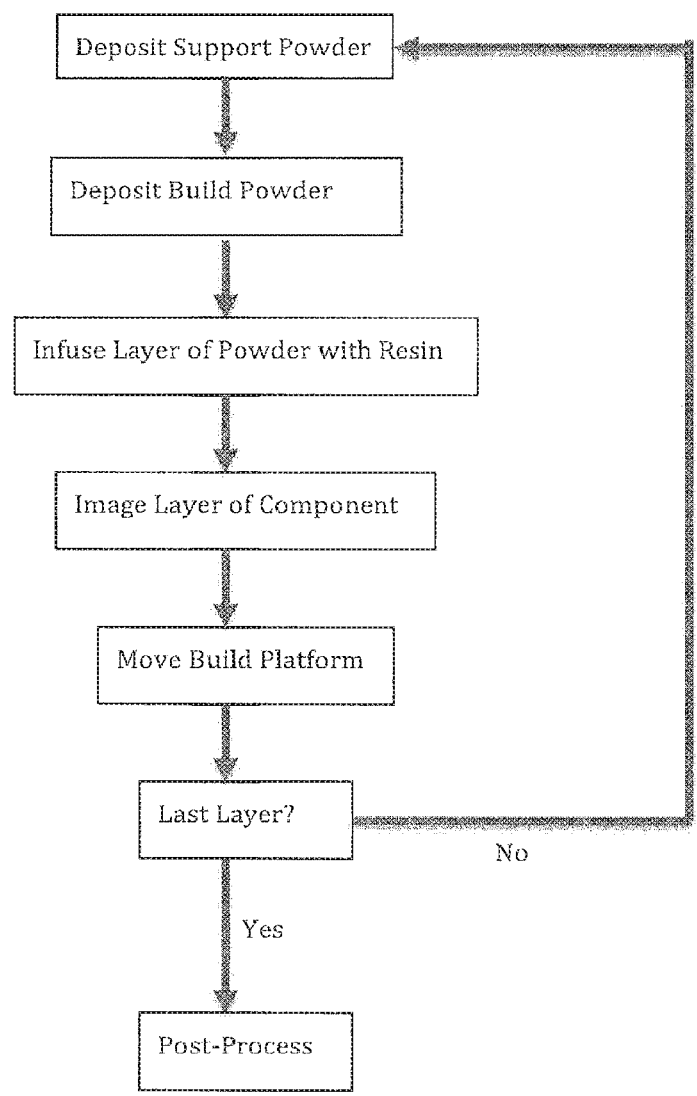
FIG. 24 is an algorithmic flowchart of a third method of fabricating powder composite components according to an embodiment of the presently disclosed subject matter.

FIG. 24 depicts an algorithmic flow chart which details the process of applying build powder and support powder to electrostatically image a layer, followed by infusion and imaging of a porous section to complete the layer fabrication process. Additional densification may be used, and in general the support and build powder may be deposited in any order or simultaneously. As previously described, this enables the use of a wide variety of combinations of powders; additionally, it allows the imaging process to be independent of the part geometry, which may be advantageous in simplifying the imaging process. In general, any light source that can produce an imaging pattern that produces a porous component may be utilized; it does not need to produce an image that conforms to the part being produced, since the part layers are imaged electrostatically during powder deposition.

Figure 25:
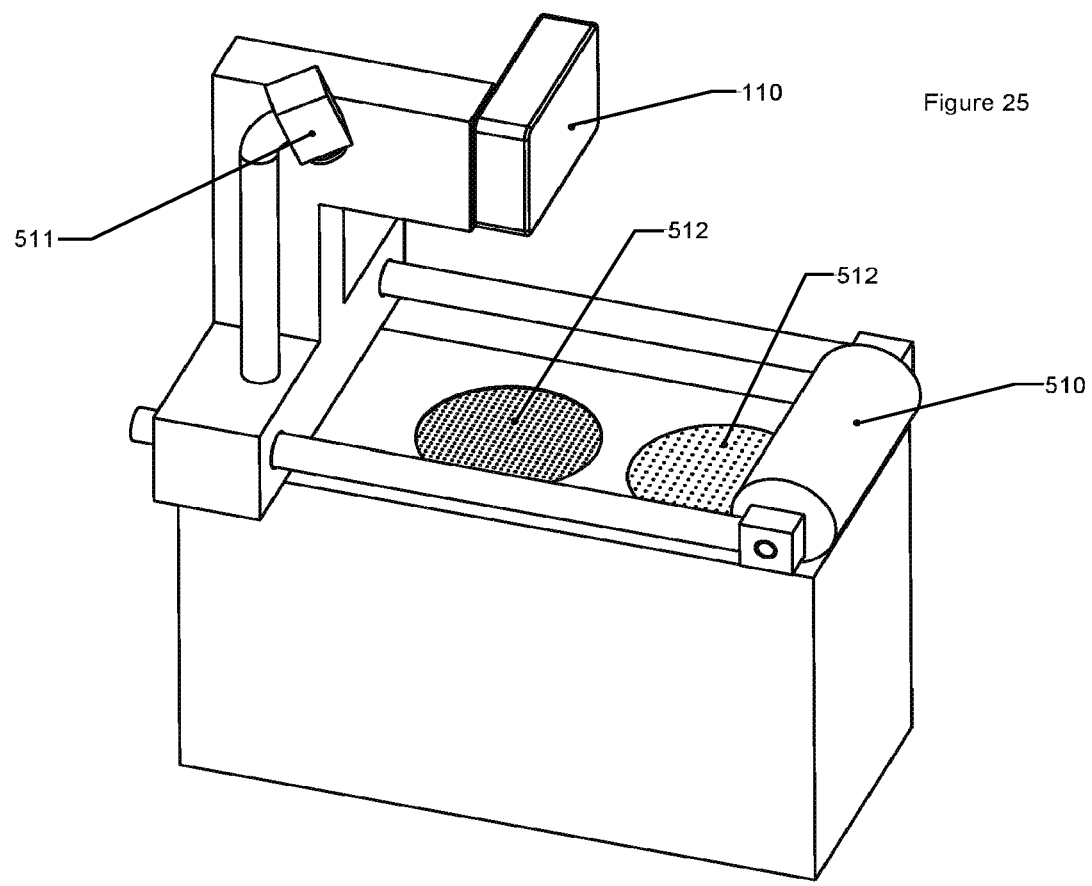
FIG. 25 is a left elevated perspective view of a feedback system implementable in any of the previously described powder composite fabrication machines in FIGS. 11-21.

FIG. 25 depicts a feedback system utilizing a camera (511) or other visual feedback mechanism for capturing images of the powder (512) at the build surface. For some formulations and configurations, as the powder (512) is infused with resin, it will darken in color, which can be detected by the camera (511) in order to validate that the infusion process is complete and uniform. This validation can help to ensure that infusion is completed prior to imaging with an imaging device (110). In the absence of a camera (511), a predefined amount of resin can be infused into the layer of powder (512) which could result in the powder (512) being either over-infused or inadequately infused, depending on the amount and magnitude of error in predicting the required amount of resin.

Figure 26:
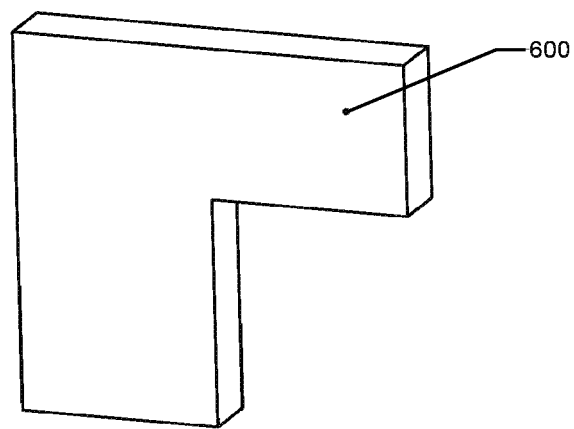
FIG. 26 is a left elevated perspective view of a component which may be fabricated by solid freeform fabrication according to an embodiment of the presently disclosed subject matter.
Figure 27:
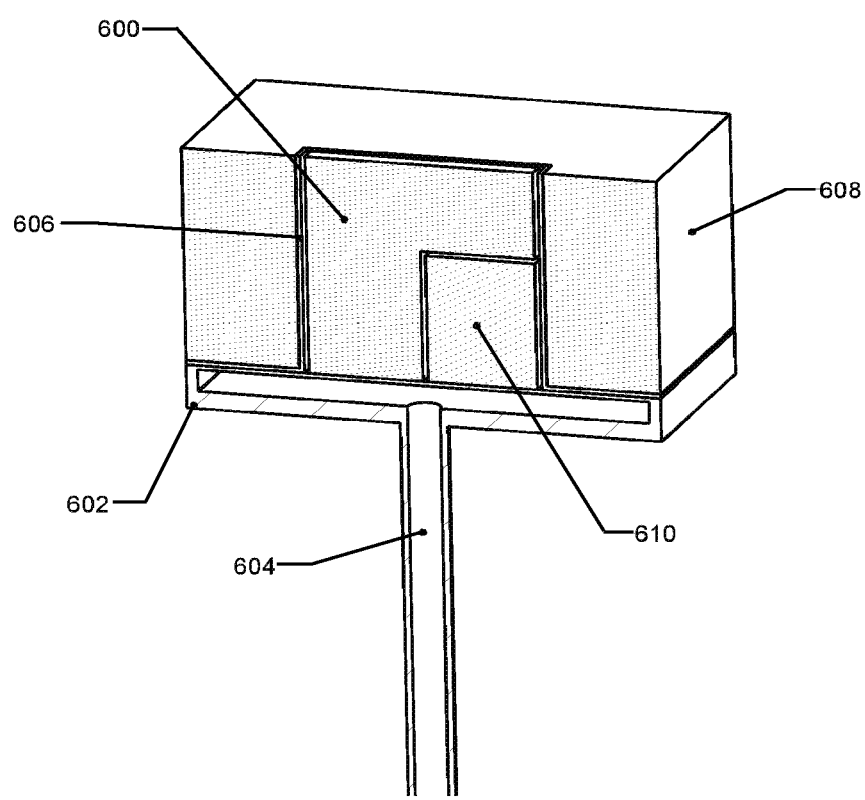
FIG. 27 is a section view of a schematic representation of a method of producing the component in FIG. 26.
Figure 28:
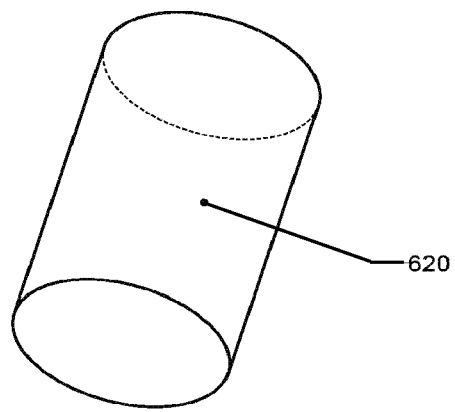
FIG. 28 is a perspective view of a second component which may be fabricated by solid freeform fabrication according to an embodiment of the presently disclosed subject matter.
Figure 29:
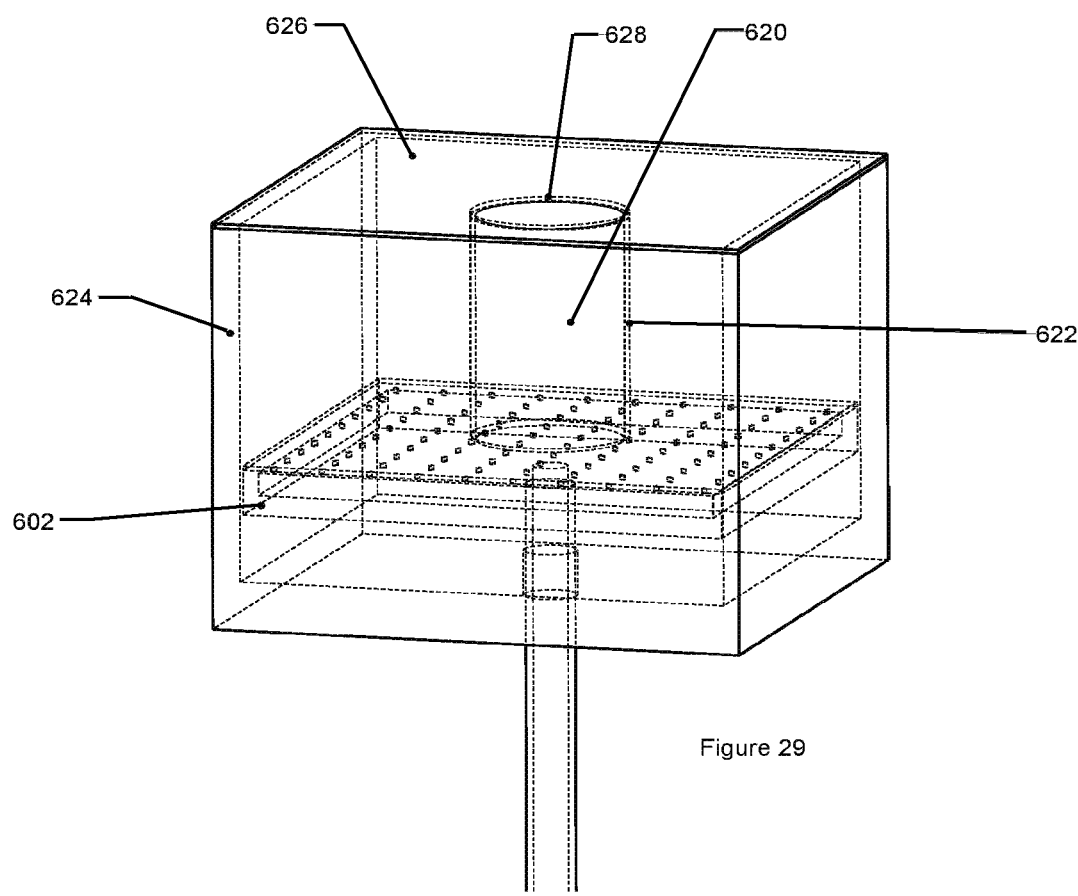
FIG. 29 is a perspective view of a schematic representation of a method of producing the component in FIG. 28.
Figure 30:
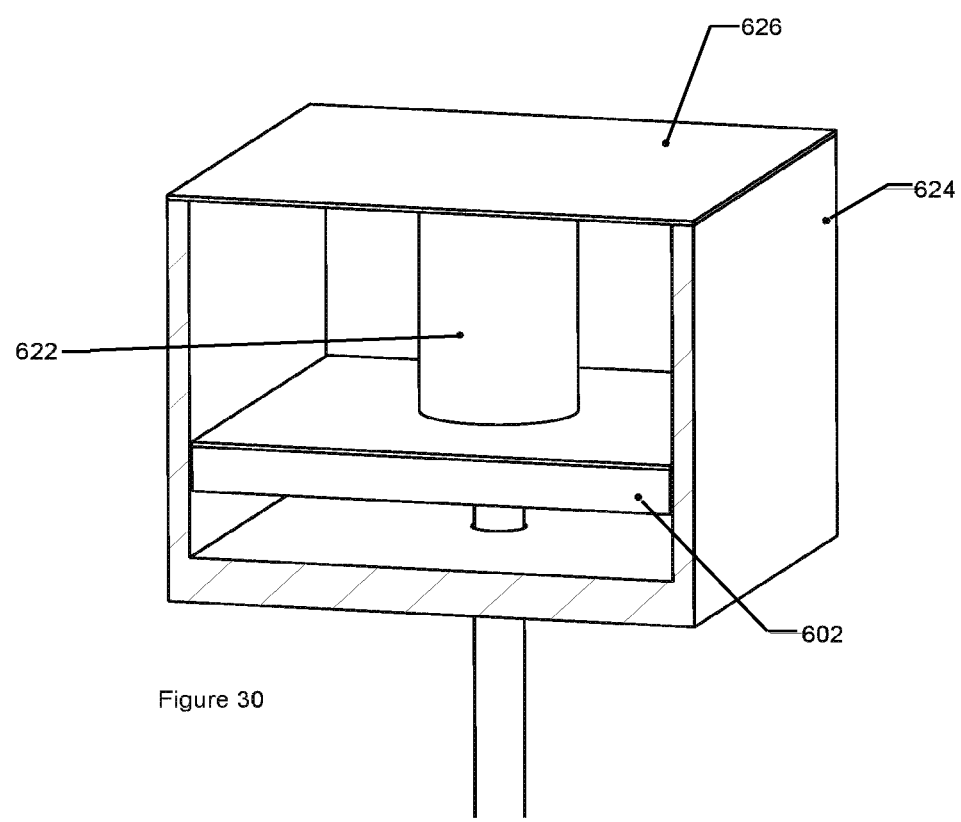
FIG. 30 is a section view of the build method shown in FIG. 29.
Figure 31:
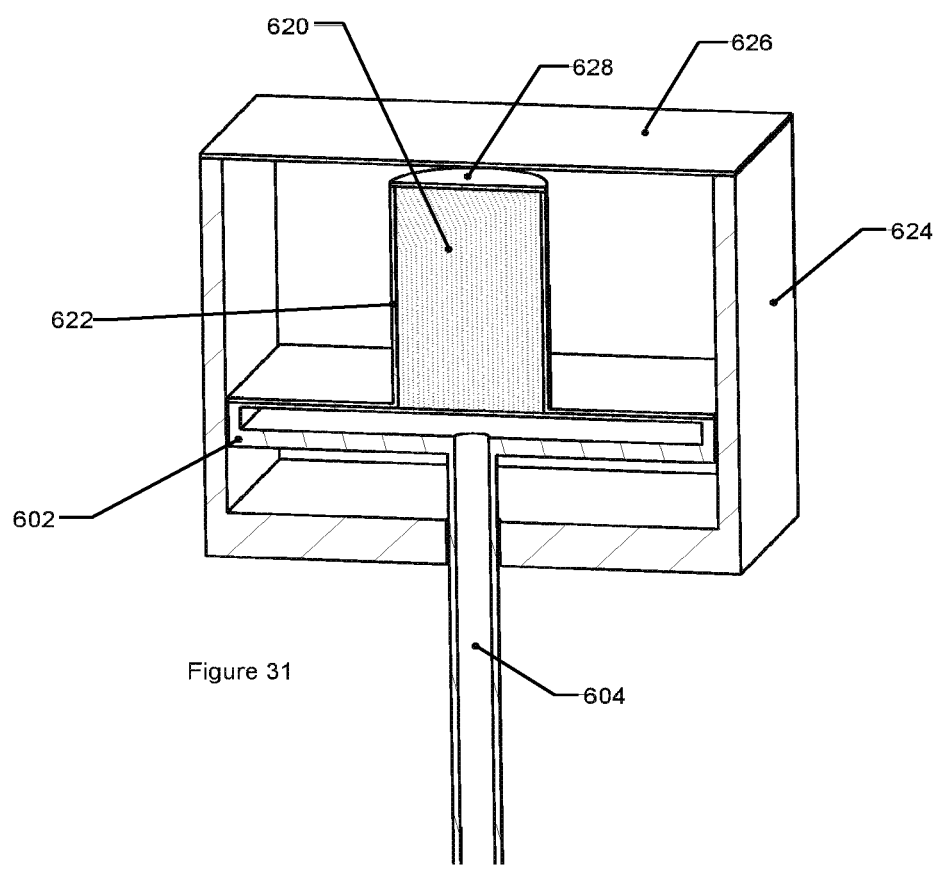
FIG. 31 is a second section view of the build method shown in FIG. 29.
Figure 32:
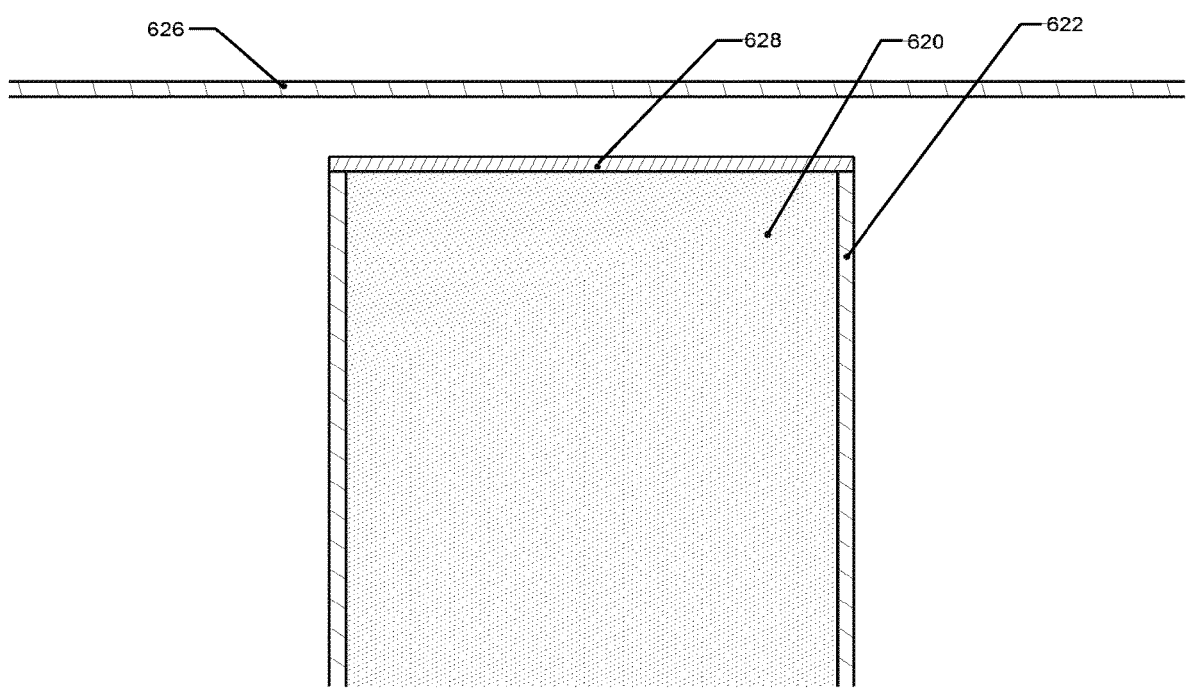
FIG. 32 is a detailed view of the build method shown in FIG. 31.

FIGS. 26 and 27 depict a component and a method of producing that component using the previously described powder composite SFF methods with an improvement which reduces wasted powder. In the previously described method, all powder within the build area was infused with resin. Once powder is mixed with resin, it may be difficult to reclaim that powder for future use. Many powders, particularly metal and ceramic powders, are very expensive, and in the interest of reducing wasted material and fabrication costs, it is advantageous to limit the amount of powder that is infused with resin during the build process.

As in the previously described SFF method, a build platform (602) is utilized which has a resin infusion channel (604) in order to infuse resin deposited on its surface. During this configuration of the build process, a skin (606) is imaged which is solid and does not allow for resin to permeate beyond its boundary. This skin (606) is imaged by digitally modulating the laser modules to produce a solid (ie non-porous) boundary layer. In general, this may be achieved with the mastering mechanism described herein, or may be achieved by utilizing a secondary imaging mechanism, such as a projector or laser galvanometer. The function of the skin (606) is independent of the means of production. This skin (606) starts along the surface of the build platform (602) and restricts which pores of the build platform (602) may supply resin to the object (600) and support structure (610) being fabricated during the build process. In this case, both the object (600) and support structure (610) are porous, in order to allow resin to flow through during the fabrication process. The benefit of using a solid skin (606) during the fabrication process is that there is a significant quantity of un-infused powder (608) which may be reclaimed and used during a subsequent build process. In conventional powder-based production, wherein a laser is used to fuse powder together to build the part, the thermal effects of this fusion process have a negative impact on the utility of the remaining powder. In order for quality to be maintained in subsequent builds, it is often necessary to discard unused powder entirely. Micro-scale metallic powders are very costly, and this method of production allows for the reclamation of a significant amount of unused powder after a build process, thus reducing waste and cost in the production process. Further details of the imaging process used to achieve this result are described in FIGS. 41-44.

In another aspect, as depicted in FIGS. 28-32, the presently-disclosed subject matter provides another method of SFF that may be utilized for producing solid plastic components (ie not powder composite components), which takes advantage of the porous imaging techniques previously mentioned. A component (620) is fabricated on a build platform (602) which utilizes an infusion channel (604) to provide resin for infusion at the build surface. This process can be contained within a build chamber (624) with an imaging access window (626) which is transparent to allow imaging access by any optical imaging system capable of curing the resin that is utilized in the build process, but is chemically impermeable to allow for isolated atmospheric control within the build chamber (624).

Similarly to the methods discussed above, the component (620) can be made porous, with a solid skin (622). In contrast to the powder composite structures formed by the previous methods, however, there is no powder, and new layers of liquid resin are produced by pumping resin through the component (610) to the top imaging surface, where a fluid surface forms (628). An advantage of this process is that it expedites the process of producing new layers of resin, since a newly imaged layer is not stuck to the bottom of a build vat, and does not require delamination prior to fabrication of the next layer, as is common in inverted build configurations, as previously described. In this instance, surface tension maintains the liquid layer (628) at the top surface of the component (620) being built; this may affect the geometry of the layer being produced, as will be addressed hereinbelow.

Figure 33:
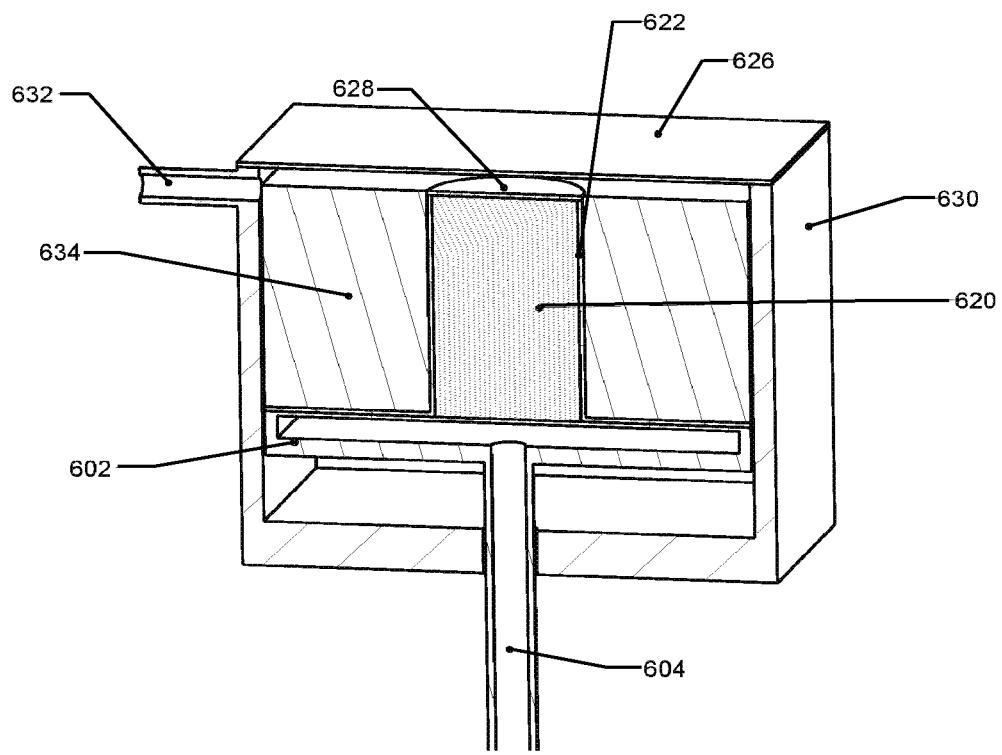
FIG. 33 is a section view of a schematic representation of a second method of producing the component in FIG. 27.
Figure 34:
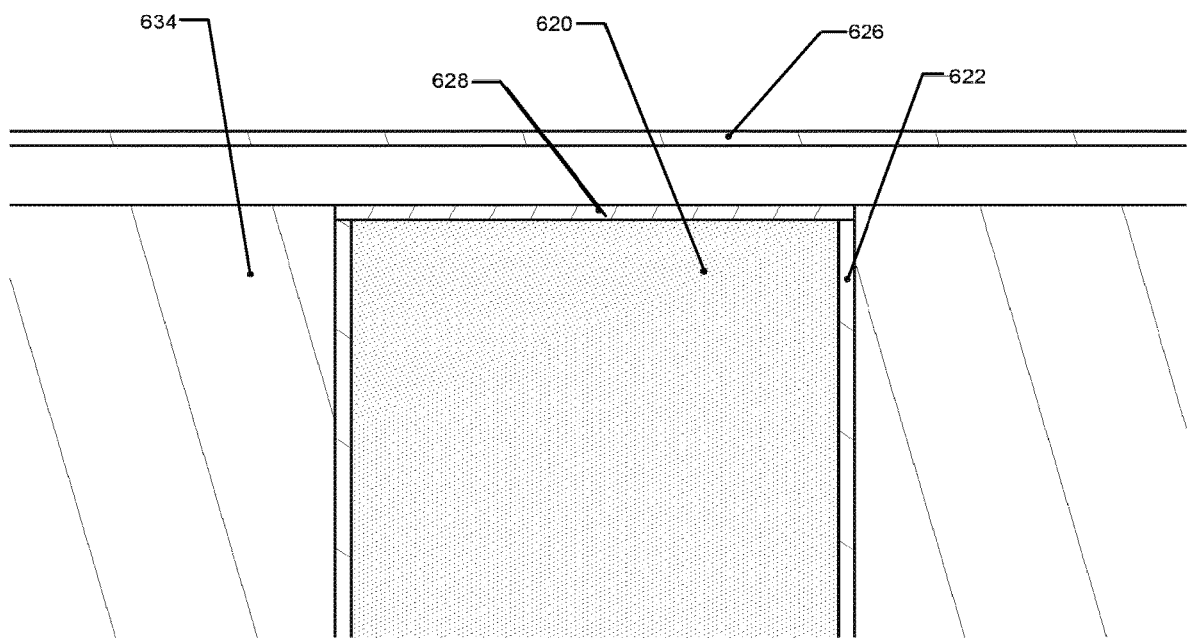
FIG. 34 is a detailed view of the build method shown in FIG. 33.

FIGS. 33 and 34 depict an alternate configuration wherein a secondary support fluid (634) is added to the build chamber (630) via a support fluid port (632). This fluid is generally immiscible with the resin being used, and is of lower density than the resin being used, such that it may prevent overflow of resin from the top of the object (620) being built. Additionally, support fluid may be chosen such that geometric edge effects in the formation of the liquid surface (628) are mitigated.

Figure 35:
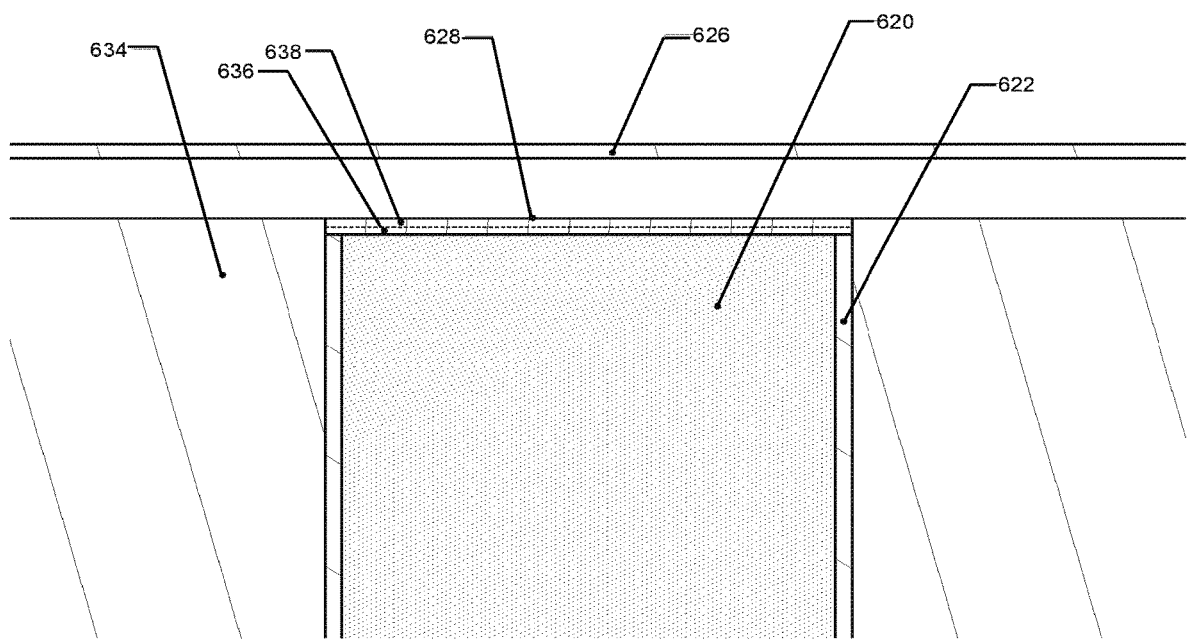
FIG. 35 is a detailed section view of a schematic representation of a third method of producing the component in FIG. 28.

FIG. 35 depicts a further configuration wherein atmospheric control is utilized to increase the oxygen concentration within the build chamber (630). Dissolved oxygen inhibits free radical polymerization, which is the reaction commonly utilized within photopolymer resins. This additional oxygen creates a polymerization dead zone (638) in which little or no polymerization may occur. Polymerization of a new build layer will thus generally occur only within the active zone (636) of the liquid layer (628).

While atmospheric oxygen is adequate to at least partially inhibit polymerization, it may be advantageous to increase oxygen concentration to control the thickness of the active zone and dead zone. In this instance, the support fluid (634) also acts as an oxygen barrier, to negate potential oxygen concentration gradient edge effects in the liquid layer (628). Alternatively, atmospheric oxygen control may also be used in the configuration depicted in FIGS. 28-32 if it is determined that concentration gradient edge effects will not reduce component precision beyond what is required far the particular application.

Figure 36:
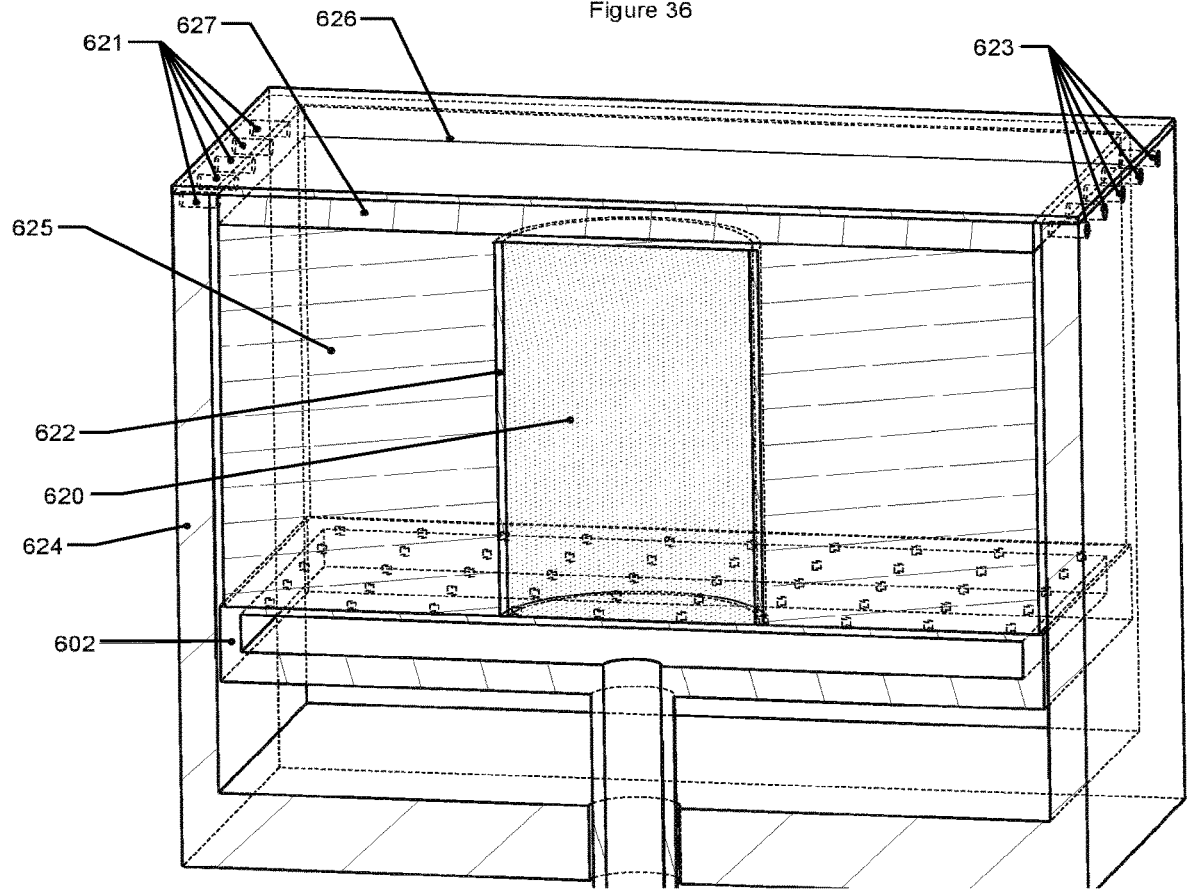
FIG. 36 is a detailed section view of a schematic representation of a fourth method of producing the component in FIG. 28.
Figure 37:
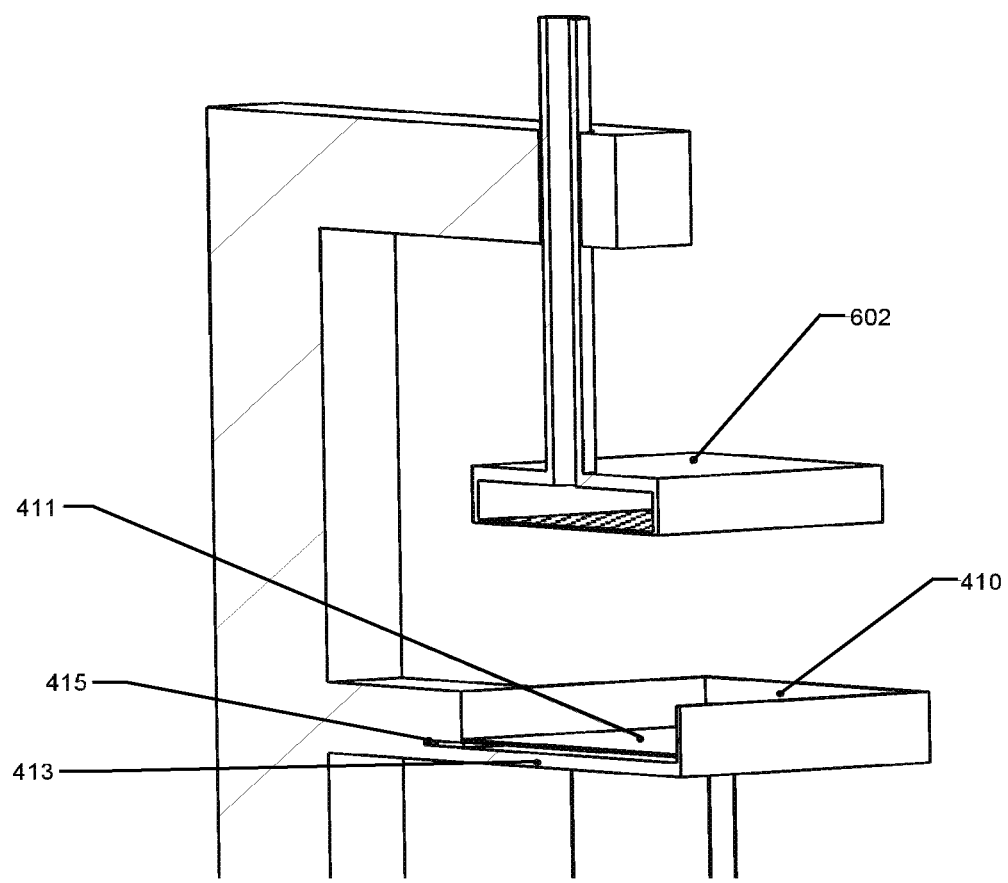
FIG. 37 is a left elevated perspective view of a fabrication machine utilizing an alternate configuration of the build process described in FIG. 29.
Figure 39:
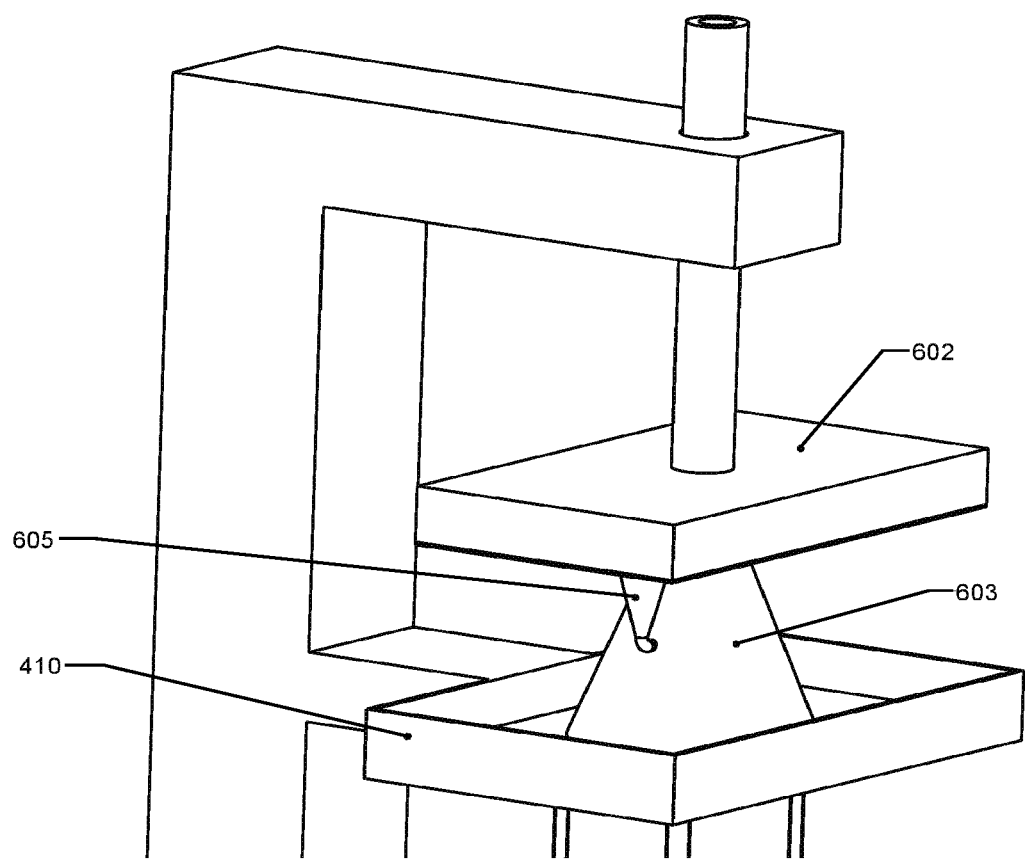
FIG. 39 is a detailed view of the device described in FIG. 37 in the process of fabricating a component.
Figure 40:
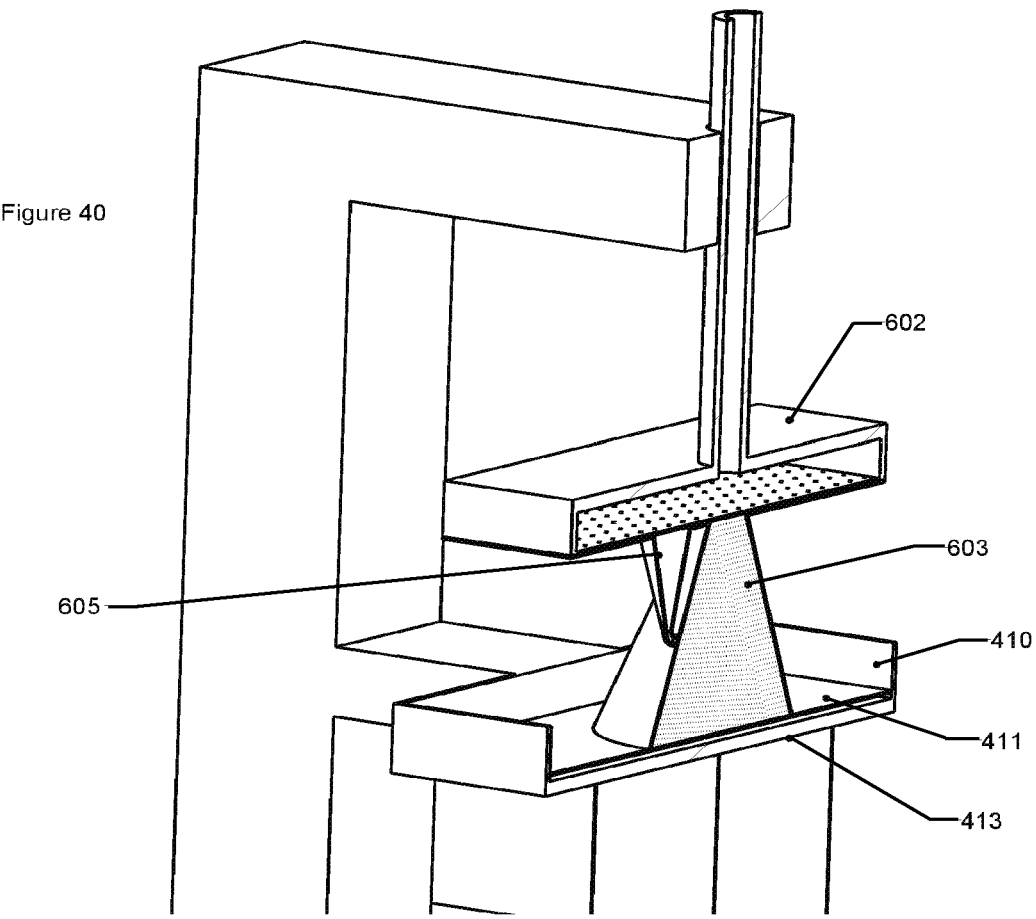
FIG. 40 is a section view of the device and component described in FIG. 39.

FIG. 36 depicts a further configuration where resin is supplied through a build platform (602) to construct a porous part (620) with a solid skin (622). In this case, overflow resin (625) surrounds the part (620). A fill fluid (627) which is immiscible with the resin, which also has desirable viscous, optical, and thermal properties, is supplied through an array of entry ports (621) and exits the build chamber through drainage ports (623). This fill fluid (627) fills the gap between the overflow resin (625) and the imaging window (626). The fill fluid (627) may in some implementations be water, or other fluid with the required properties. In contrast to the support fluid (634) described above, which is selected to have a density that is greater than that of the resin being used, the fill fluid (627) can be selected to have a lower density than that of the resin. In this way, whereas support fluid (634) is designed to occupy much of the space within build chamber (630) around part (620) and prevent resin on the top layer from overflowing, the fill fluid (627) can be used in situations where the build chamber (630) would be mostly filled with resin, and the fill fluid (627) can be designed to flow across the top of the overflow resin (625), which ensures even distribution of new resin on top of the part (620) being built.

In addition, in some embodiments, the fill fluid (627) is configured to absorb thermal energy created during the imaging process. During rapid fabrication involving photopolymer resin, a significant amount of heat is created, and this heat can negatively impact the mechanical properties of the part (620) being built. Adding a layer of this fill fluid (627) to act as a coolant for this process mitigates this issue. The particular cooling capacity of a given fluid will vary depending on the thermal interaction between the resin and the cooling fluid; certain fluids may be more suited for certain resins. The choice of cooling fluid should be made in order to optimize cooling effects (lowest interfacial thermal resistance) while also utilizing viscous interactions to assist in resin distribution. While the fill fluid (627) in this image completely fills the gap between the overflow resin (625) and the imaging window (626), in some instances an aft gap between the fluid (627) and imaging window (626) may be acceptable. Generally, the number of optical interfaces through which optical energy must travel in order to image a layer of material is reduced if there is no air gap, and the optical energy is less likely to be disrupted or lose precision if there is no air gap, but depending on the properties of the fluid (627) and the rate at which it flows through the build chamber (624), an air gap may be desirable.

In another aspect of the presently-disclosed subject matter, FIGS. 37-40 depict an alternate configuration using a bottom-up build system, similar to the configuration described in FIGS. 3-10. One of the primary challenges with a bottom-up build configuration is the requirement that a cured layer of material be delaminated from the bottom of the build vat before new resin can flow underneath the part for a new layer to be imaged. In this configuration, the bottom of the build vat (410) contains two layers, a rigid transparent window (413) and a flexible transparent window (411) separated from the rigid transparent window by a gap (e.g., an air gap). As a part (603) is withdrawn from the flexible window (411), flexion of the window (411) allows the window to be peeled away from the new layer rather than being pulled away all at once, which can result in a comparatively gentler delamination process. In some embodiments, a pressure sensor (415) can be provided in communication with the gap, and the pressure sensor (415) may be utilized as an indirect measure of the volume of air in the gap between the flexible window (411) and the rigid window (413) in order to determine when the flexible window (411) has returned to its original (i.e., non-deformed) position, and the next layer can be imaged.

To further ameliorate the delamination problem, in some embodiments, resin is pumped through the build platform (602) and through the porous part (603) as in previously described configurations, By supplying resin through the part (603), this alleviates the challenge of overcoming viscous resistance when creating new layers of material, which is a significant limiting factor when optimizing the speed of this type of fabrication system. The porous internal structure of the part (603) being fabricated will create a vertical resin pressure gradient, which will result in lower fluid pressure at the build surface, and higher build pressure within the build platform (602). In order to alleviate this pressure gradient, and reduce any stress it may cause to the part (603), one or more additional resin channels (605) may be fabricated during the build process, and removed during post-processing. Even if the vertical pressure gradient cannot be completely diminished, the inclusion of the one or more additional resin channels (605) can be helpful to reduce the pressure to a level that would be unlikely to cause damage to the part (603). The channel (605) depicted here is a hollow resin supply conduit, with negligible resin pressure loss across its height when compared to the pressure gradient normally present in the part (603) being built. This method may in general be applied to any of the previously described methods and configurations for fabricating porous components by supplying resin through a build platform (602).

In the aforementioned plastic fabrication methods, a porous part is produced. This part may require post-curing to solidify the remaining fluid resin within it. Alternatively, the remaining liquid resin may be drained, and the part may be filled with another polymer and cured. This polymer may be a photocurable resin, an epoxy resin, or other filler chosen to achieve desired mechanical properties. Additionally, the porosity of this part may be advantageous in an investment casting process, where the burnout properties of the component would be significantly improved by the reduction of material within the component.

Figure 41:
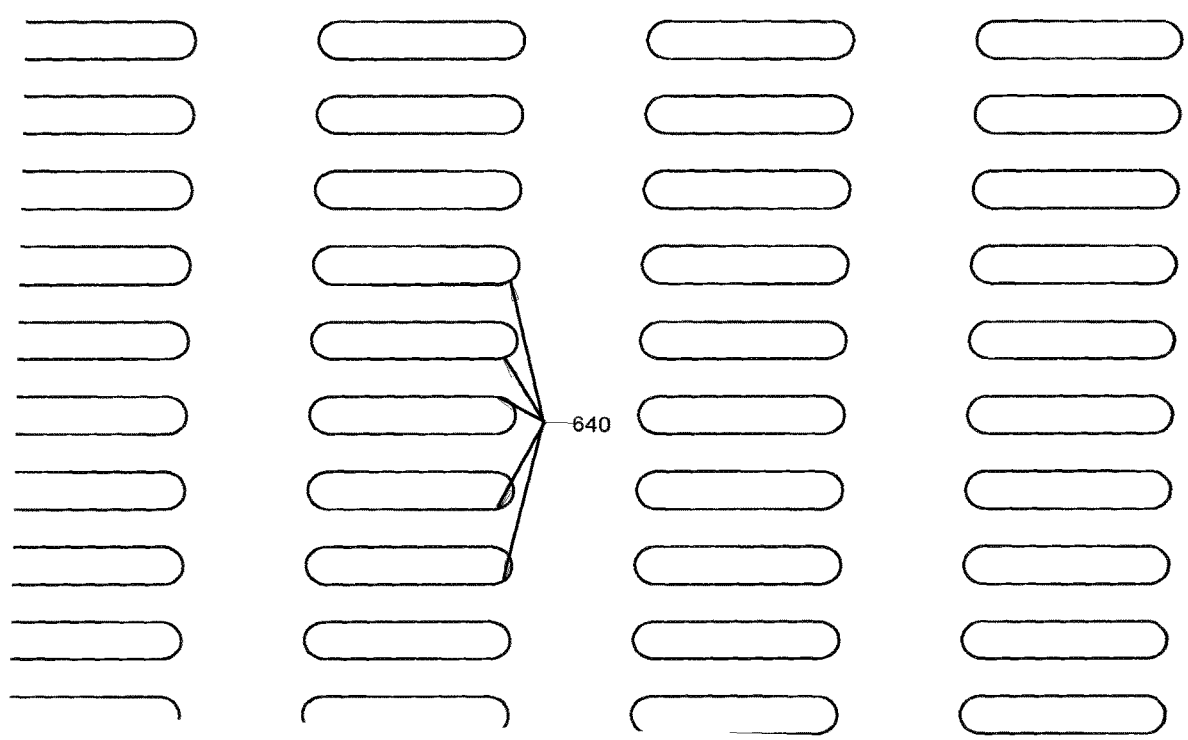
FIG. 41 is a view from above of one layer of the raster patterns used in any prior fabrication method for building composite or plastic components according to an embodiment of the presently disclosed subject matter.
Figure 42:
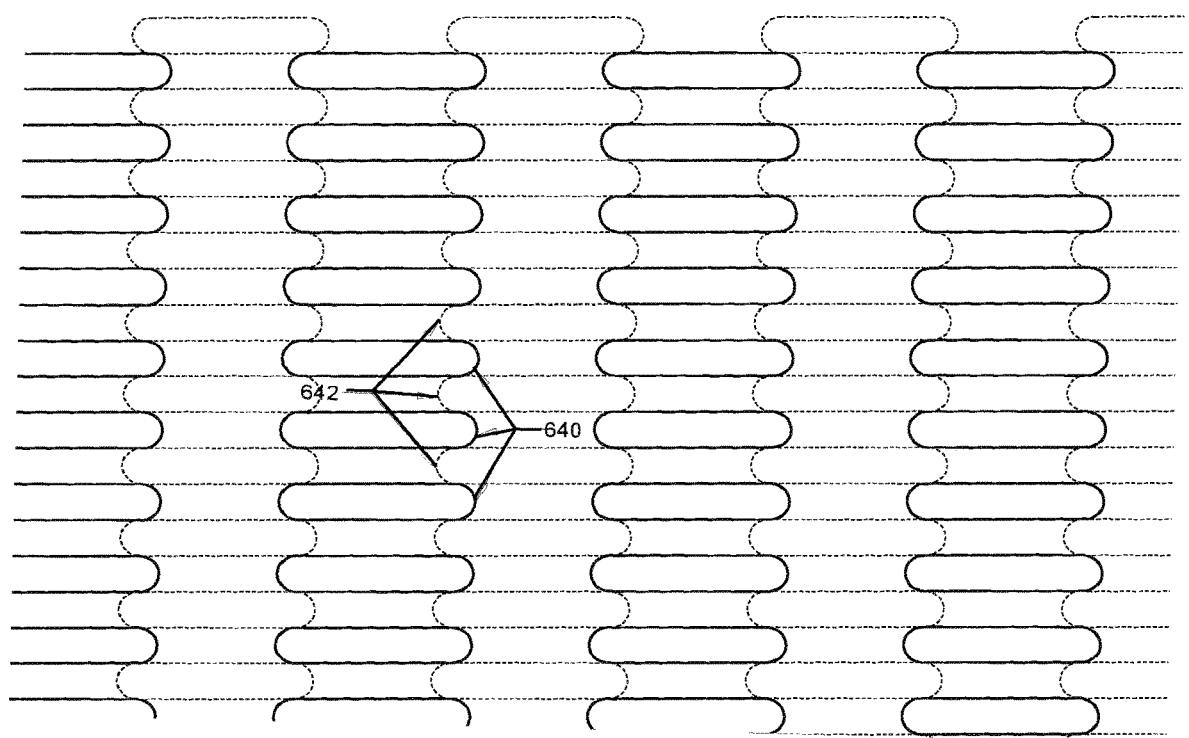
FIG. 42 is a view from above of two layers of the raster patterns used in any prior fabrication method for building composite or plastic components according to an embodiment of the presently disclosed subject matter.

In another aspect, the present subject matter provides a method for forming an object by solid freeform fabrication. Regardless of the particular kind of SFF process used, a desirable degree of porosity can be achieved by controlling the irradiation of the photocurable materials. In some embodiments, for example, the imaging device used to irradiate the photocurable materials can be activated to image only a selected fraction (e.g., less than 40-70 percent) of the cross section of the object being built. In particular, FIGS. 41-44 depict a set of raster patterns producible with any of a variety of imaging systems, including the imaging system described in FIGS. 3-10. FIG. 41 depicts a first cure pattern (640) used on a first layer, and FIG. 42 depicts a second cure pattern (642) used on a second layer. Assuming cure parameters are chosen properly, and build process alternates first (640) and second (642) cure patterns between adjacent layers, the net result will be a lattice structure with greater than 40-60% porosity, allowing for a structurally sound object that will readily allow fluid to flow through it. It should be noted that while the nominal porosity of the cured structure may be greater than 60%, it is desirable to have as low a porosity of the powder substrate as possible, as previously discussed. The combined porosity of the object being built, when this technique is applied to powder composite fabrication, will likely be lower than 15-25%. In general, a higher powder loading density will yield higher quality components, but will inhibit resin flow to a greater degree; it is therefore desirable to utilize a cure pattern which provides the minimal amount of structural integrity necessary for the component to remain intact during the build process and postprocessing, while maximizing cure pattern porosity to reduce resistance to resin flow.

Figure 43:
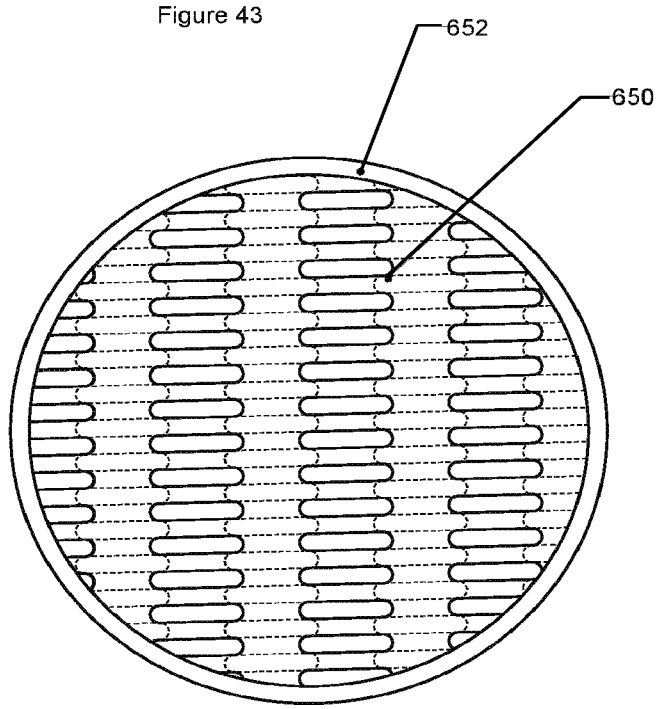
FIG. 43 is a view from above of a first set of cure patterns which may be used to fabricate the component in FIG. 28.
Figure 44:
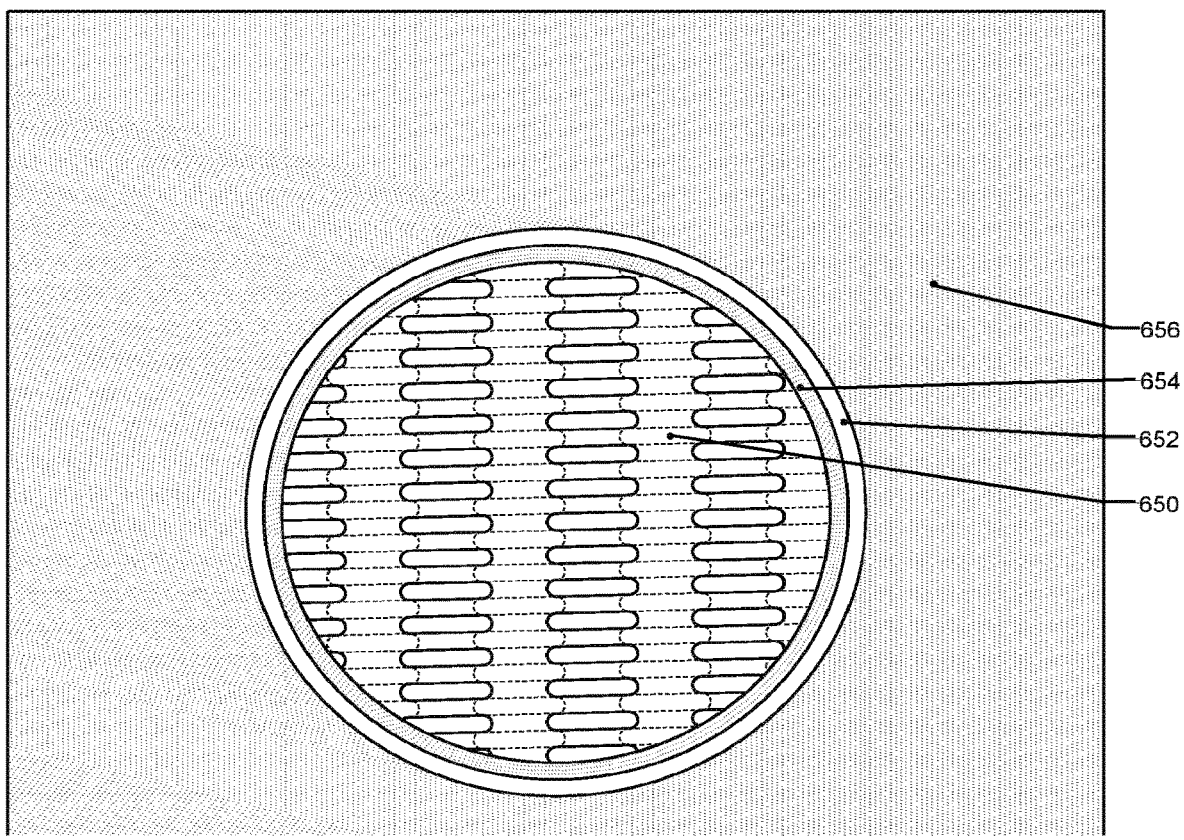
FIG. 44 is a view from above of a second set of cure patterns which may be used to fabricate the component in FIG. 28.

FIG. 43 depicts these cure patterns as applied to the plastic fabrication method described in FIGS. 28-32, This method cures a solid skin (652) around a porous interior structure (650). This cure method may be achieved by using one or more programmable light sources, including the system described in FIGS. 3-10. Alternatively, any of a variety of other programmable light sources, used individually or in combination together, can be used to achieve a desired cure pattern. FIG. 44 depicts the application of these cure patterns as applied to the composite fabrication method described in FIGS. 26 and 27. As previously indicated, a porous structure (650) is imaged, with a boundary layer (654) separating the component from a solid skin (652). Lin-infused powder (656) can be preserved for future use. In this instance, the skin acts as a fluid flow conduit along with the boundary layer. If there are overhanging regions in the object being built that would normally require support structure, this may be replaced by fluid flow structures that allow resin to infuse these overhanging regions without attaching any support structure to them. The skin will still control the resin flow to preserve unused powder, and the boundary between the skin and the object being built allows the object to be supported by the surrounding powder (both infused and un-infused) without physical supports that directly connect to the object being built. As a result, the surface of the object will be unmarred by connection points from support material, as is typical in other SLA fabrication processes. The separation of the skin (652) from the object (650) provides additional fluid flow for infusion, and may reduce the amount of post-processing required when cleaning the component prior to sintering or other treatment.

Figure 45:
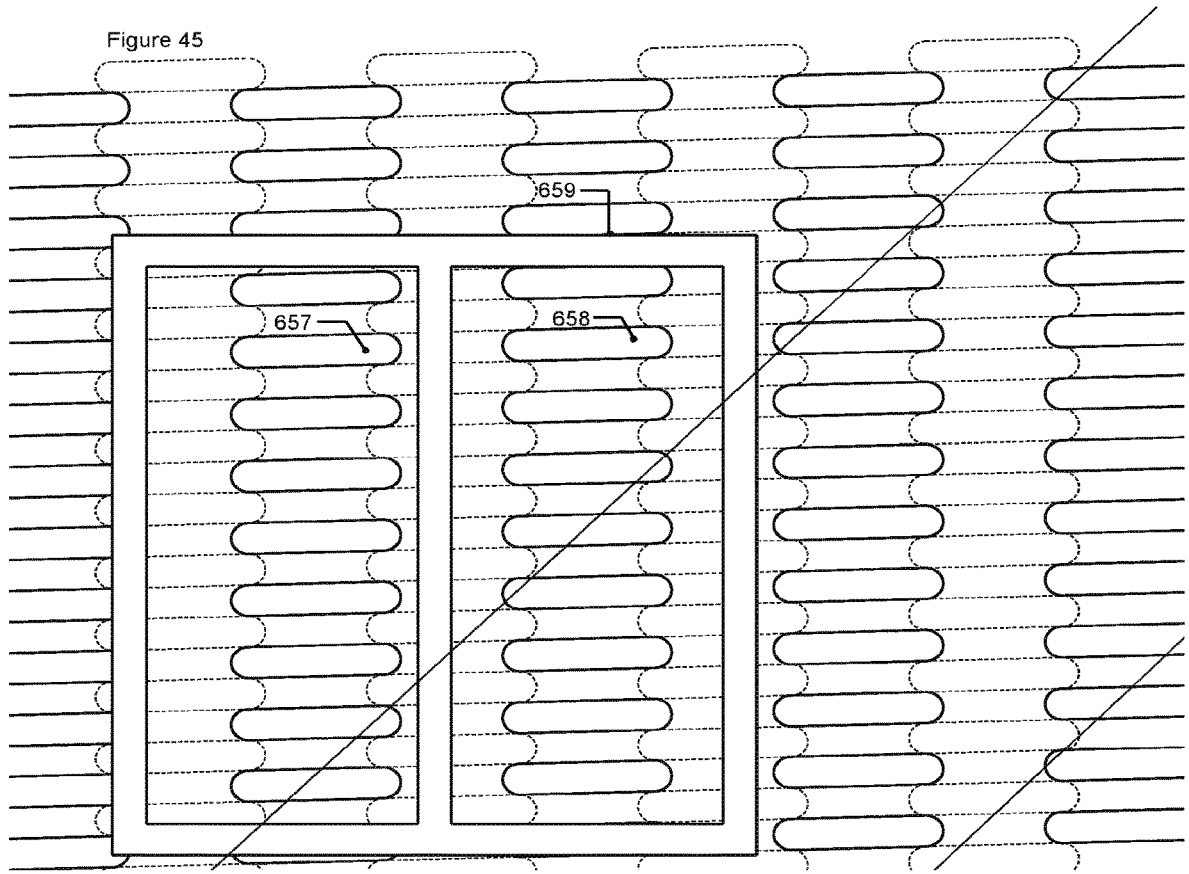
FIG. 45 is a view from above of a set of cure patterns which may be used to fabricate components with modular fluid channels.

FIG. 45 depicts a cure pattern that may be utilized in any of the powder composite or porous polymer fabrication methods and configurations previously described. In some cases, it may be desirable to produce a component with multiple porous subsections (657, 658). Assuming the walls (659) that divide these sections (657, 658) are thin enough such that resin flow in subsequent layers is not unduly restricted, this may be implemented without substantially deviating from the previously described fabrication methods and configurations. There are several applications where this imaging method is advantageous. For example, when printing tooling for injection molding, it is often desirable to produce conformal cooling channels to control the temperature of the tooling during the injection process. These porous subsections can be used as conformal cooling channels to improve tooling performance. Further, the previously described methods of infiltrating a component during post-processing can be improved if different mechanical properties are desirable in different sections of a printed component. Porous subsections may be drained of uncured resin and infiltrated with different materials to produce enhanced flexibility, rigidity, toughness, strength, or other physical properties that are desirable for specific regions of a printed part. In the example of printed tooling, a zone may be defined by the interior surface of the tool with a particular thickness; this zone may be constructed as an isolated porous section, which may be filled with heat-resistant material to improve tooling performance, while additional zones beyond this first zone are constructed as conformal cooling channels around this inner zone.

Figure 46:
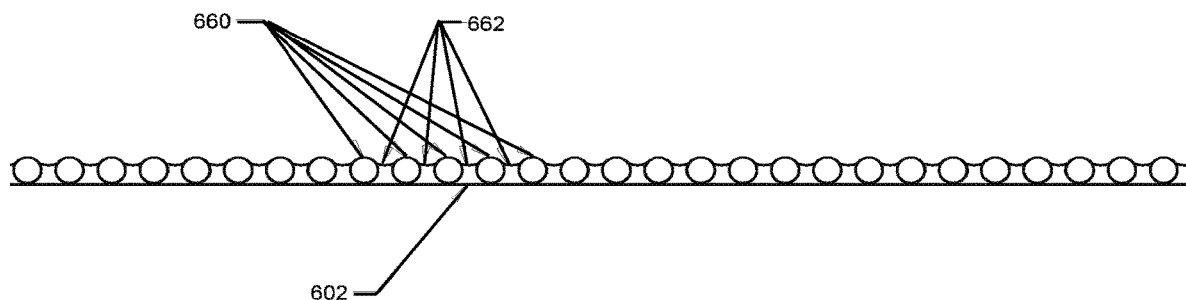
FIG. 46 is a left section view of a first layer of a component fabricated using the in situ infusion method used in previously described fabrication methods according to an embodiment of the presently disclosed subject matter.
Figure 47:
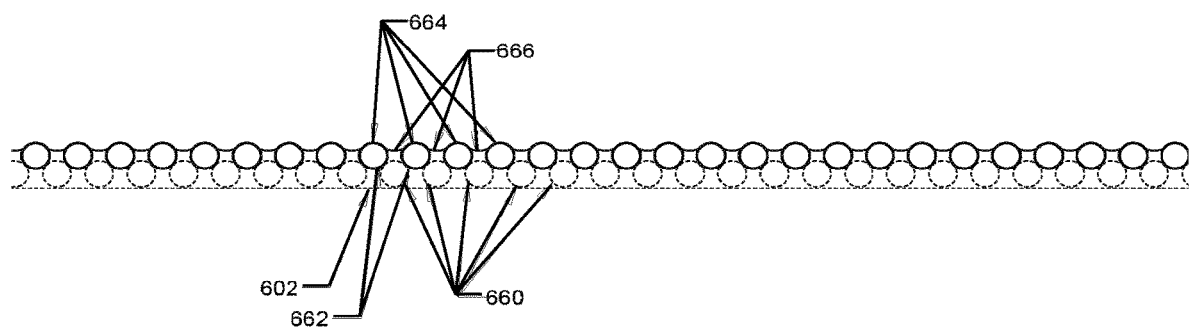
FIG. 47 is a view of the first and second layers of the component in FIG. 46.

FIGS. 46 and 47 show the interaction between an infused layer and a second layer during infusion. As previously described, powder particles (660) are deposited on a build platform (602) and infused with resin. Menisci (662) form between these particles (660), which allows for gaps in which more particles may be deposited, but still provides enough resin which may be imaged to bind the powder together in a porous structure. A second layer of powder particles (664) are infused with resin, and new menisci (666) are formed during the process of infusing the second layer. This process is repeated until a complete component is produced.

Figure 48:
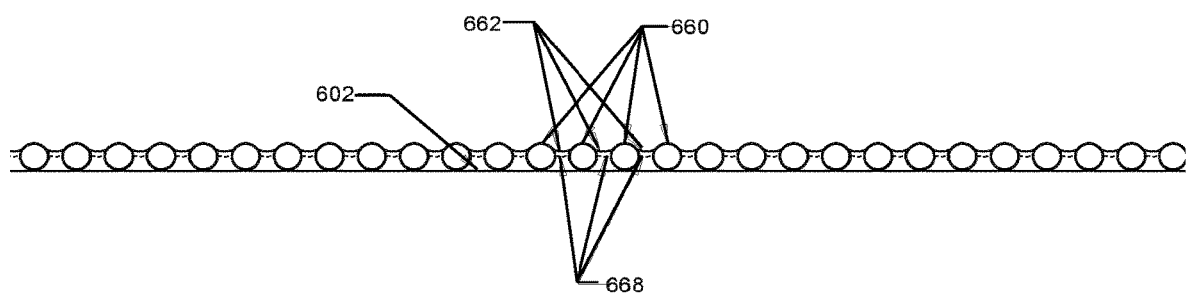
FIG. 48 is a left section view of a first layer of a component fabricated using a second configuration of the in situ infusion method used in previously described fabrication methods according to an embodiment of the presently disclosed subject matter.

FIG. 48 shows an alternate method of enabling infusion and imaging of powder layers. If the atmosphere of the build area is controlled such that oxygen levels are raised, a polymerization dead zone forms at each of the menisci (662) in a given layer. This lowers the surface (668) at which polymerization may occur. An advantage of this method is that it allows yet more space for new powder to be deposited without compromising the ability of the system to bind together powder. In this regard, this system can provide stable binding between powder particles in which resin flow is not inhibited, and the arrangement of powder in the built component is homogeneous. This will provide the best possible green part for sintering during post-processing.

Figure 49:
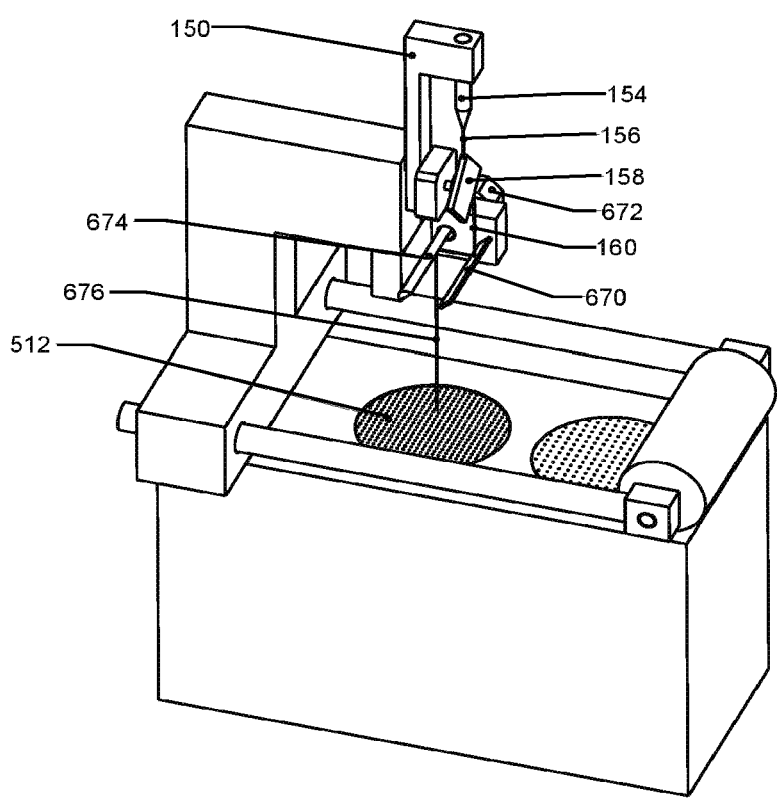
FIG. 49 is a left elevated perspective view of a solid freeform fabrication machine utilizing a refractive rastering mechanism for direct fusion of powder material according to an embodiment of the presently disclosed subject matter.
Figure 50:
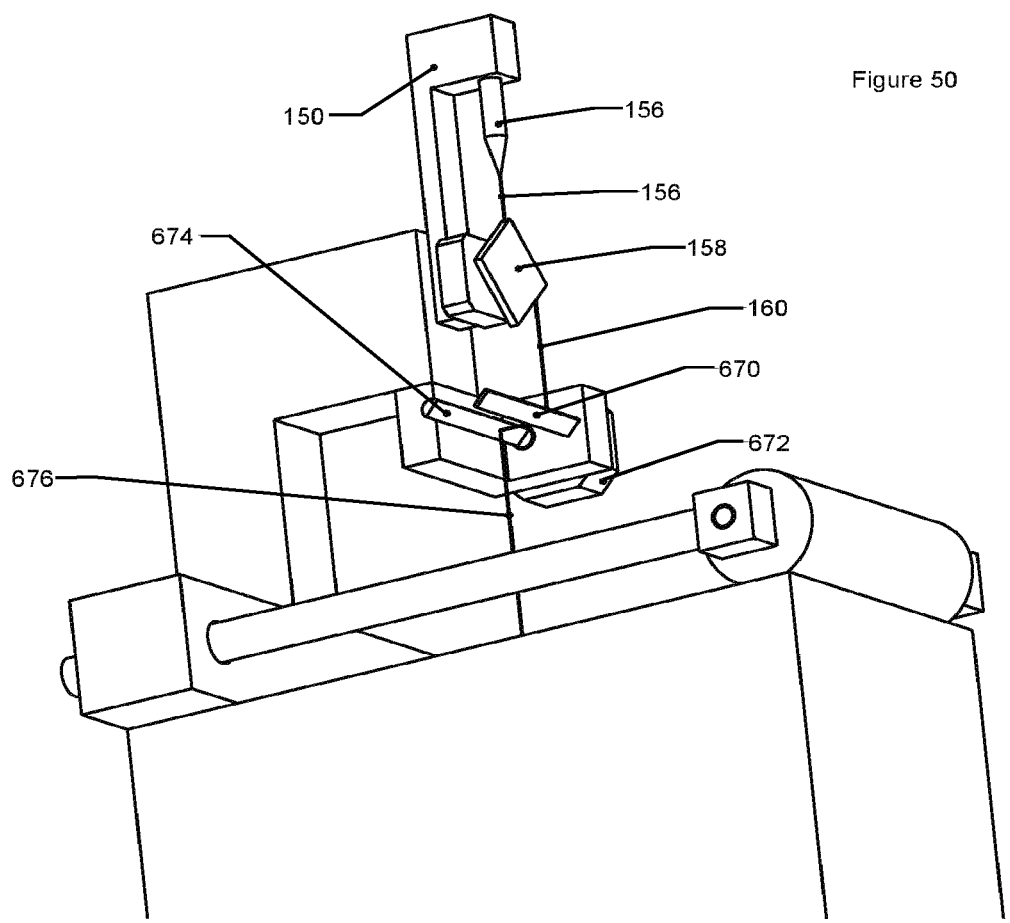
FIG. 50 is a perspective view of the device described in FIG. 49.

FIGS. 49 and 50 depict an alternate configuration in which powder is directly fused to produce a printed component. In conventional laser sintering applications, a laser galvanometer is utilized to fuse sections of layers of powder to fabricate components, but such systems can typically achieve scanning speeds of less than 10 m/s. It is advantageous in these applications to have higher rastering rates to limit thermal effects which compromise resolution (e.g., weld beads forming during the binding process due to thermal saturation). Since the rastering module (150) previously described is indifferent to the wavelength of energy used, it may be implemented with any wavelength of energy, assuming an appropriate refractive material can be selected for the prism (158). In this implementation, the exigent beam (160) from the rastering module (150) is reflected off of a fixed mirror (670) and onto a panning mirror (674) controlled by a rotary actuator (672), similar to the imaging system described in FIGS. 3-10. The resulting beam (676) is subsequently rastered over the powder layer (512) on the build platform, and digitally modulated to image a section of a part. In addition, whereas laser galvanometer systems can typically only achieve scan speeds of less than 10 m/s, the disclosed rastering module (150) can be operated at scan speeds of over 100 m/s while still maintaining very high precision in monitoring the position of the beam.

Figure 51:
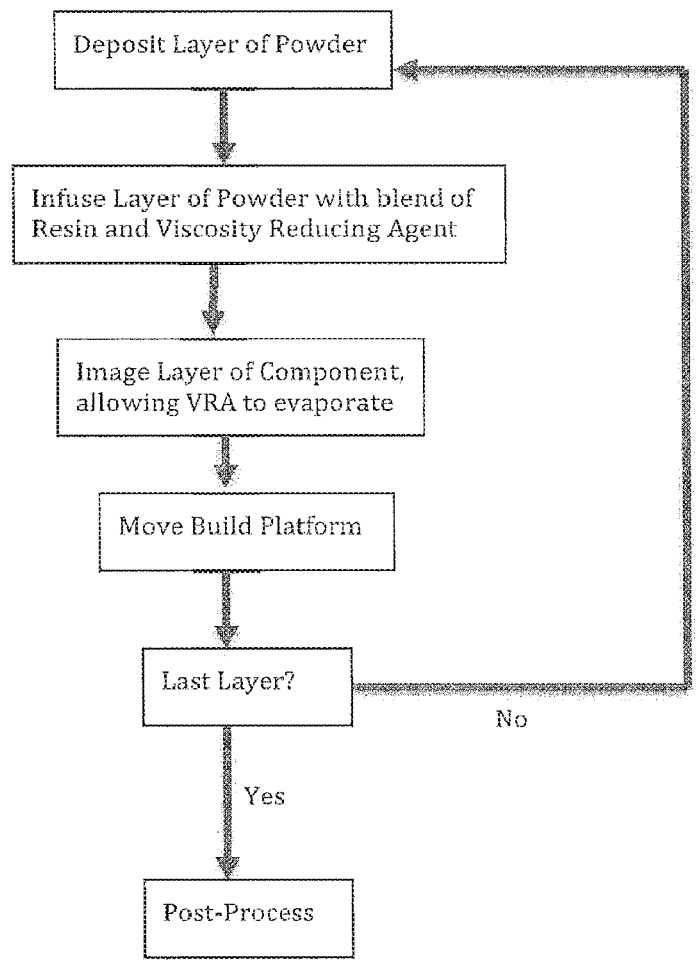
FIG. 51 is an algorithmic flowchart describing a method of producing a powder composite green part according to an embodiment of the presently disclosed subject matter.

FIG. 51 describes a method of producing a powder composite green part utilizing any of the previously described methods and configurations. In the previously described methods and configurations, resin is infused into powder through a build platform. The speed of this process is partially dependent on the speed of this infusion process.

This speed may be improved by the addition of a Viscosity Reducing Agent (VRA) to the resin. Organic solvents, such as alcohols, may serve this purpose. Ideally, this VRA has a high vapor pressure, such that upon exposure to the build surface, and the heat created during the imaging process, the VRA will evaporate, producing a concentration gradient in which there is a high concentration of VRA in the resin that is contained in the body of a part being printed, and a low concentration of VRA at the build surface.

Figure 52:
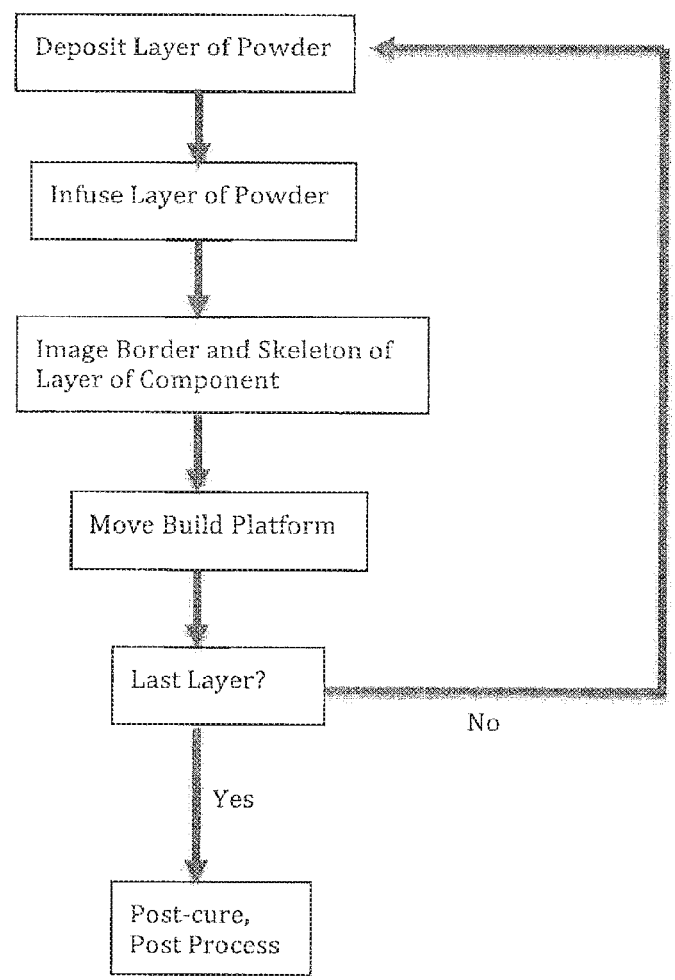
FIG. 52 is an algorithmic flowchart describing a second method of producing a powder composite green part according to an embodiment of the presently disclosed subject matter.

FIG. 52 describes a second method for producing a green part. In the previously described methods and configurations, a skin and porous internal structure were imaged to construct the green part. In general, it may not be necessary to construct a full porous internal structure; it may be sufficient to construct a skeletal internal structure. As has been previously discussed, the importance of the internal structure of a green part is to provide structural support during the production and post-processing phases; any structure which is adequate to this task, while requiring as little material to be cured as possible, will optimize build time for a given component. In some cases, post-curing may be required to give the green part the required structural integrity to survive the debinding and sintering process.

Figure 53:
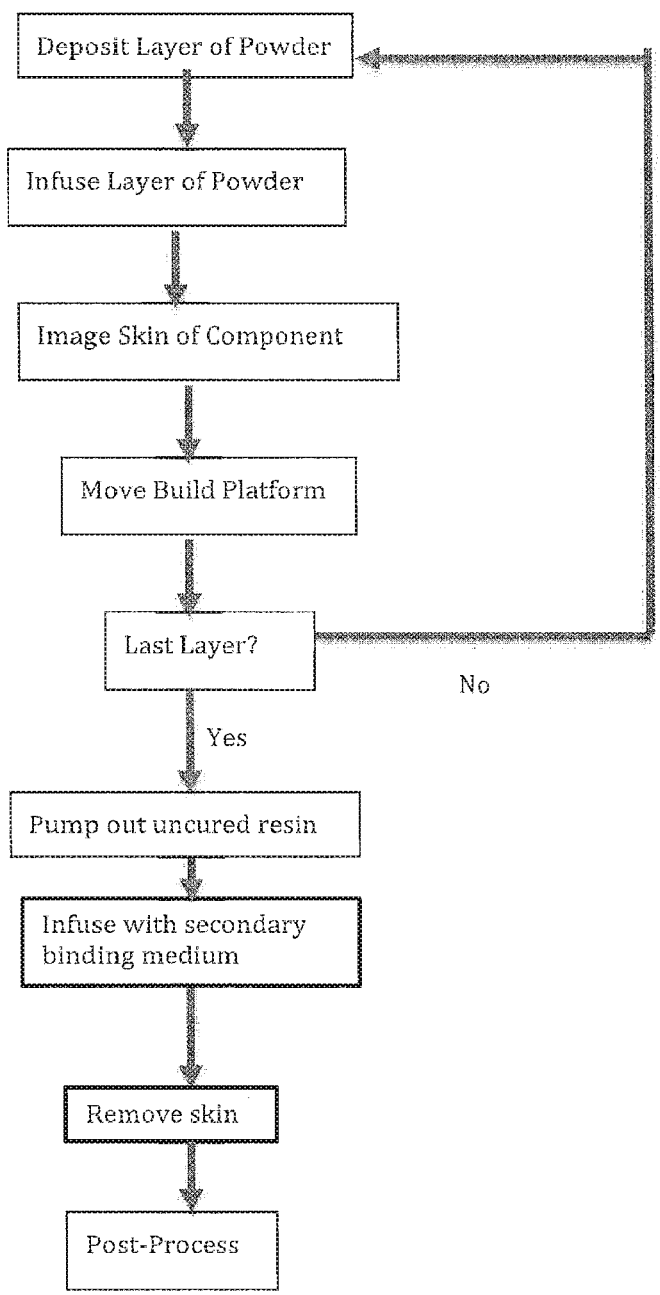
FIG. 53 is an algorithmic flowchart describing a third method of producing a powder composite green part according to an embodiment of the presently disclosed subject matter.

FIG. 53 describes a third method for producing a green part. This is a further variation on the method described in FIG. 52. In this method, only a skin of the part is imaged. An important distinction between this method and previous methods, is that in this case, the "skin" that is imaged is defined such that the internal surface of this skin is the external surface of the part being produced. The process of imaging the skin leaves a significant amount of uncured resin within the part being built. This resin may be drained from or pumped out of the part after the printing process is complete, and the resulting component may be infused with wax or other binding medium. The skin may be removed by chemical treatment, resulting in a green part which contains only powder and the secondary binding medium. This method may be desirable in situations where the burnout properties of the photopolymers are suboptimal. Specifically, many typical photopolymers have measureable ash content remaining after a burnout process when used for investment casting. This ash content is typically measured as a fraction of the original volume of material. Although resins specifically intended for casting purposes may have ash content ratings of roughly 0.1%-0.25%, this may still be considered too high in some situations, in which case the use of a wax or other secondary binding medium may be beneficial. In PIM manufacturing, for example, waxes and other polymers that can be completely removed (i.e., have negligible ash content) during debinding and sintering are typically used. Some photopolymers have been developed with good burnout properties, but none perform as well as the polymers traditionally used in PIM manufacturing; this process takes advantage of the properties of all materials involved. In some implementations, the skin may be imaged as in previous configurations, and need not be removed prior to post-processing. The optimal implementation of this method will depend on the binding and powder materials utilized.

Figure 54:
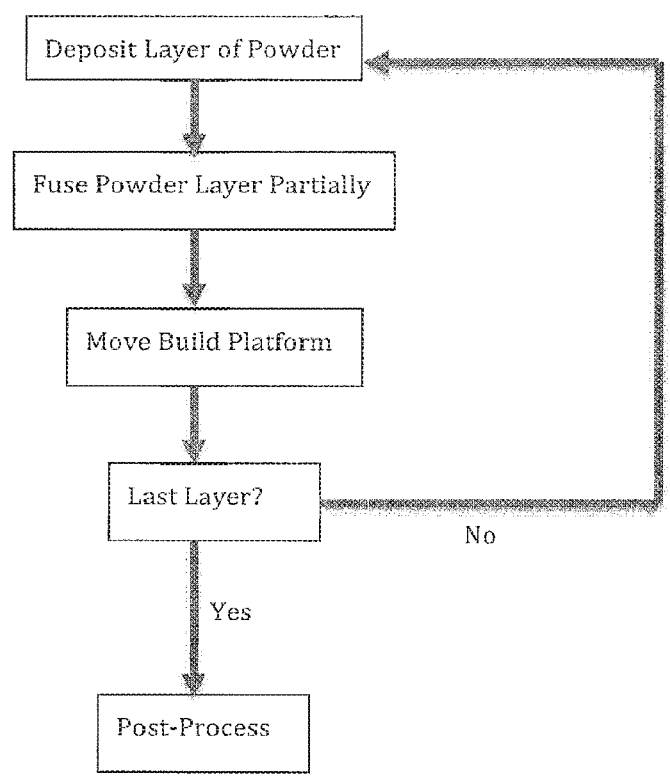
FIG. 54 is an algorithmic flowchart describing a method of producing a porous brown part according to an embodiment of the presently disclosed subject matter.

FIG. 54 describes a method of producing a porous part, possibly utilizing the configuration described in FIGS. 49 and 50. Rather than produce a green part, which is bound by a polymer binder, this method utilized direct fusion of powder feedstock to produce a partially sintered porous component. Typically, in laser sintering applications, there are significant internal stresses produced during the sintering process due to the shrinkage undergone by layers of material as they are sintered. By only partially sintering layers of material, these stresses can be largely avoided. This will produce a part that is an arrangement of powder particles only slightly adhered to one another, similar to a brown part produced after debinding a green part as previously described. As such, this part may be post-processed in a similar manner to produce a densified final component. Since this post-processing involves uniform heating, no additional thermal stresses are created during this process.

Figure 55:
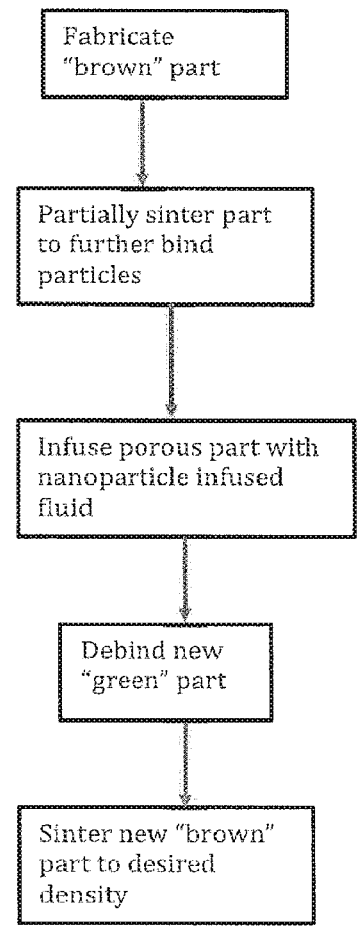
FIG. 55 is an algorithmic flowchart describing a method of post-processing a green part or brown part according to an embodiment of the presently disclosed subject matter.
Figure 56:
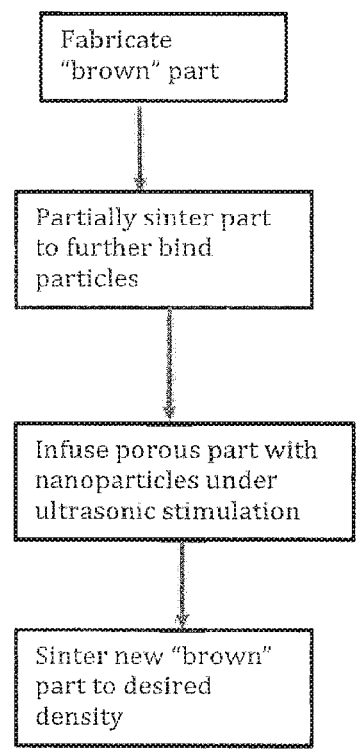
FIG. 56 is an algorithmic flowchart describing a second method of post-processing a green part or brown part according to an embodiment of the presently disclosed subject matter.

FIGS. 55 and 56 describe methods of improving precision in the sintering process that may be applied to any of the aforementioned methods and configurations capable of producing brown parts for sintering. In general, it is desirable to achieve the highest powder loading density possible in a green part. This density is calculated as the volume of powder in a green part relative to the overall volume of the part. This also predicts the amount of shrinkage that will occur during sintering. Higher amounts of shrinkage may distort the part, compromising precision. In general, powder bed infusion methods can readily achieve approximately 60-65% powder loading density. After fabrication and debinding, a brown part is produced. This part may also be produced according to the methods and configurations described in FIGS. 49, 50, and 54. This part can also be approximately 65% volumetrically dense. Multimodal powder, in which the particle size distribution contains multiple peaks, may be used to increase this initial density. Additionally, the density may be increased by subjecting the brown part to a secondary infusion process. In order to increase the powder loading density of the brown part, it may be infused with nanoparticles of the same material as the initial powder used during fabrication. Particles which are small enough to freely flow through the pores left in the brown part may be introduced by flowing a suspension of particles in a liquid carrier into the brown part, or by exposing the brown part to a bath of particles under ultrasonic stimulation to enhance particle fluidity. It should be noted that flowing particles or a liquid suspension of particles over a surface is an abrasive process; in order to preserve the structural integrity of the part, it may be necessary to subject the part to an initial partial sintering process to further bind particles together while maintaining enough porosity to allow for this secondary particulate infusion process. Once the brown part has been partially sintered and infused with particles, its void fraction (the volumetric fraction of non-powder material in the part) may be reduced from approximately 35% to approximately 10-12%, thus reducing the amount of shrinkage required to obtain a densified part and also reducing potential distortion.

These methods of adding particulate matter to increase the volumetric fraction of powder in a green part can also have particularly advantageous effects when combined with the previously described method of imaging discrete porous zones within a part during fabrication. For example, isolating different zones in a green part can allow particular sections to be infused with particulate material prior to full sintering to achieve different densities in different regions of the finished part. A part may require a dense skin, but benefit from a porous interior; this may be applied to printed metal tooling with conformal cooling channels built into the interior of the tool. This may also apply to tooling such as drill bits, mill bits, router bits, and such, which would require a fully dense outer surface to form a cutting edge, but may benefit from a somewhat porous interior to allow coolant to be pumped through the tool. In this instance, small porous regions would have to be left as exit ports for the coolant flow, and the net result would be a high performance cutting tool that could be digitally fabricated with arbitrary geometry.

In many of the previously described methods, reference has been made to metal and ceramic powders being used as a primary build material, particularly for the fabrication of green parts which can be sintered into partially or fully dense final components. In general, any powder or blend of powders may be utilized, and any resin with the desired flow properties to match the powder or powder blend may be utilized in this build process. Several additional options are described hereinbelow.

A blend of plastic and graphite powder may be utilized such that the final product may be self-lubricating in nature. Additionally, blends of metal and graphite powder may be utilized to achieve an end product with similar properties. Blends of plastic and metal powder, wherein the ratio of plastic to metal is in excess of 5:1, may be utilized such that post processing via induction or microwave treatment causes additional fusion of adjacent plastic particles due to heat given off by metal particles. Additional combinations of powder may be used for build powder, and additional combinations of powder may be used as support powder, depending on the desired post-processing steps and desired end product.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A powder composite fabrication machine comprising:
   a build platform defining a top side and a distribution chamber that is opposite to the top side and in communication with the top side via a plurality of holes;
   a powder transfer device configured to deliver a first layer of a powder material to the top side of the build platform;
   a resin supply system configured to deliver a photocurable material through the build platform and via the distribution chamber and the plurality of holes for infusion into the first layer of the powder material; and
   an imaging device positioned above the top side of the build platform and configured to irradiate at least a portion of the photocurable material in the first layer of the powder material to form at least a portion of a first layer of a powder composite component from the first layer of the powder material infused with the photocurable material,
   wherein the powder transfer device is configured to deliver a second layer of the powder material on the first layer of the powder material, the resin supply system is configured to deliver the photocurable material through the build platform and the first layer of the powder material infused with the photocurable material for infusion into the second layer of the powder material, and the imaging device is configured to irradiate at least a portion of the photocurable material in the second layer of the powder material to form at least a portion of a second layer of the powder composite component from the second layer of the powder material infused with the photocurable material.

2. The powder composite fabrication machine of claim 1, wherein the build platform is selectively movable with respect to the imaging device to accommodate the formation of multiple layers of the powder composite component.

3. The powder composite fabrication machine of claim 1, wherein the powder transfer device comprises a roller that is movable to transfer the powder material from a powder supply chamber to the build platform.

4. The powder composite fabrication machine of claim 3, wherein the roller comprises one of a counter-rotation roller or an electrostatic transfer roller.

5. The powder composite fabrication machine of claim 1, wherein the powder transfer device is configured to deliver powder material from multiple powder sources.

6. The powder composite fabrication machine of claim 5, wherein the powder material includes different powder materials from the multiple powder sources, respectively.

7. The powder composite fabrication machine of claim 6, wherein the different powder materials are selected from the group consisting of a plastic powder, a metal powder, a ceramic powder, and a semiconductor powder.

8. The powder composite fabrication machine of claim 6, wherein the different powder materials include a build powder and a support powder.

9. The powder composite fabrication machine of claim 8, wherein the build powder comprises a metal powder and the support powder comprises a non-metallic powder.

10. The powder composite fabrication machine of claim 1, comprising a compression device configured to control a density of the powder material delivered to the build platform.

11. The powder composite fabrication machine of claim 10, wherein the compression device is configured to increase a volumetric powder loading density of the powder material to be greater than a free density after delivering of the powder material.

12. The powder composite fabrication machine of claim 1, further comprising a powder supply chamber for supplying the powder material to the powder transfer device, wherein the powder transfer device is configured to transfer a metered quantity of the powder material from the powder supply chamber to the build platform.

13. The powder composite fabrication machine of claim 12, further comprising a powder supply piston to expel the metered quantity of the powder material from the powder supply chamber.

14. The powder composite fabrication machine of claim 1, wherein the imaging device is configured to irradiate the photocurable material over a selected fraction of a respective cross-section of the powder composite component to form at least a portion of a selected layer of the powder composite component to have a porosity sufficient to allow the photocurable material to flow through the selected layer during delivering of the photocurable material,
   wherein the powder transfer device is configured to deliver the powder material on top of one or more previously irradiated layers of the powder composite component,
   wherein the resin supply system is configured to deliver the photocurable material through the one or more previously irradiated layers of the powder composite component to infuse the powder material, and
   wherein the imaging device is configured to irradiate at least a portion of the photocurable material to form at least a portion of a next layer of the powder composite component.

15. The powder composite fabrication machine of claim 14, wherein the imaging device is configured to irradiate less than 70 percent of the respective cross-section of the powder composite component.

16. The powder composite fabrication machine of claim 1, wherein the imaging device is configured to irradiate only a perimeter of a respective cross-section of the powder composite component to form a skin around the powder material and the photocurable material.

* * * * *